United States Patent
Polunkin et al.

(10) Patent No.: US 12,378,489 B2
(45) Date of Patent: Aug. 5, 2025

(54) ADDITIVE FOR LIQUID FUELS, FUEL COMPOSITIONS BASED ON THE ADDITIVE, AND METHODS OF MANUFACTURE

(71) Applicant: FUELGEMS, INC., San Francisco, CA (US)

(72) Inventors: Ievgen Polunkin, Kiev (UA); Jacek Bogdan Jasinski, San Francisco, CA (US); Dmytro Vinnichenko, Kiev (UA); Kirill Gichunts, Kiev (UA)

(73) Assignee: FUELGEMS, INC., San Francisco, CA (US)

(*) Notice: Subject to any disclaimer, the term of this patent is extended or adjusted under 35 U.S.C. 154(b) by 0 days.

(21) Appl. No.: 18/441,805

(22) Filed: Feb. 14, 2024

(65) Prior Publication Data
US 2024/0301309 A1 Sep. 12, 2024

Related U.S. Application Data

(62) Division of application No. 17/611,087, filed as application No. PCT/US2020/033849 on May 20, 2020, now Pat. No. 11,939,548.
(Continued)

(51) Int. Cl.
*C10L 1/12* (2006.01)
*B01J 19/08* (2006.01)
(Continued)

(52) U.S. Cl.
CPC ........... *C10L 1/1225* (2013.01); *B01J 19/088* (2013.01); *C01B 32/18* (2017.08); *C10L 1/1208* (2013.01);
(Continued)

(58) Field of Classification Search
CPC ...... C10L 1/1225; C10L 1/1208; C10L 10/08; C10L 1/1824; C10L 1/1852;
(Continued)

(56) References Cited

U.S. PATENT DOCUMENTS 6,645,438 B1 * 11/2003 Dubrovsky ............ B82Y 40/00
422/186
6,835,218 B1 12/2004 Drozd et al.
(Continued)

FOREIGN PATENT DOCUMENTS

CN 1565965 A 1/2005
JP 2009/063154 3/2009
(Continued)

OTHER PUBLICATIONS

Borgohain et al., "Electrochemical Study of Functionalized Carbon Nano-Onions for High Performance Supercapacitor Electrodes", Journal of Physical Chemistry, vol. 116, (2012) pp. 15068-15075.
(Continued)

*Primary Examiner* — Daniel C. McCracken
(74) *Attorney, Agent, or Firm* — Knobbe Martens Olson & Bear LLP

(57) ABSTRACT

A nanostructure includes a plurality of substantially spherically curved carbon layers having diameters in a range of 1 nanometer to 1000 nanometers and a plurality of halogen atoms attached to an outer convex side of the carbon layers. A composition of matter includes a liquid fuel and an additive including at least one liquid and a plurality of carbon nano-onions. A method of fabricating an additive for liquid fuel includes creating a carbon-based material using a plasma in an environment including at least one hydrocarbon gas and/or at least one liquid containing hydrocarbons, organometallic metal-complex, and/or element-organic compounds, evaporating organic material from the carbon-
(Continued)

based material, halogenating the carbon-based material, and extracting carbon nano-onions from the halogenated carbon-based material.

24 Claims, 20 Drawing Sheets

Related U.S. Application Data

(60) Provisional application No. 62/851,375, filed on May 22, 2019.

(51) Int. Cl.
*B82Y 30/00* (2011.01)
*B82Y 40/00* (2011.01)
*C01B 32/18* (2017.01)

(52) U.S. Cl.
CPC ........ *B01J 2219/0805* (2013.01); *B82Y 30/00* (2013.01); *B82Y 40/00* (2013.01); *C01P 2004/17* (2013.01)

(58) Field of Classification Search
CPC ..... C10L 2200/0423; C10L 2200/0446; C10L 2200/0469; C10L 2200/0476; C10L 2270/026; C10L 1/1216; C10L 2250/06; C10L 2270/04; B01J 19/088; B01J 2219/0805; B01J 2219/0801; B01J 2219/0809; B01J 2219/082; B01J 2219/0839; B01J 2219/0841; B01J 2219/0869; B01J 2219/0875; B01J 2219/0877; B01J 2219/0898; C01B 32/18; C01B 32/15; B82Y 30/00; B82Y 40/00; C01P 2004/17
See application file for complete search history.

(56) References Cited

U.S. PATENT DOCUMENTS

| | | |
|---|---|---|
| 11,939,548 B2 | 3/2024 | Polunkin |
| 2006/0008404 A1 | 1/2006 | Hwang |
| 2006/0239888 A1 | 10/2006 | Nubler |
| 2007/0042089 A1 | 2/2007 | Grah |
| 2009/0220407 A1 | 9/2009 | Echegoyen et al. |
| 2012/0033294 A1 | 2/2012 | Beausoleil et al. |
| 2018/0273379 A1 | 9/2018 | Riso et al. |
| 2023/0373791 A1 | 11/2023 | Jasinski |

FOREIGN PATENT DOCUMENTS

| | | |
|---|---|---|
| WO | WO 2014/178810 | 11/2014 |
| WO | WO 2014/178811 A1 | 11/2014 |
| WO | WO 2005/060648 A2 | 7/2015 |
| WO | WO 2020/236962 | 11/2020 |
| WO | WO 2022/076468 | 4/2022 |

OTHER PUBLICATIONS

Bystrzejewski et al. "Large scale continuous synthesis of carbon-encapsulated magnetic nanoparticles",Nanotechnology, Institute of Physcis Publishing, Bristrol, GB, vol. 18, No. 14, Apr. 11, 2007.
Extended European Search Report for EP Application No. 20809870.7 dated May 4, 2023 in 13 pages.
Georgakilas et al., Organic Functionalization and Optical Properties of Carbon Onions, Journal of the American Chemical Society, vol. 125, No. 47, Oct. 31, 2003 [retrieved on Nov. 23, 2021). Retrieved from the Internet: URL: https://pubs.acs.org/doi/10.10211ja0342805>. pp. 14268-14269.
halogen, accessed online at https://www.britannica.com/science/halogen on Apr. 3, 2023.
International Search Report and Written Opinion in PCT Application No. PCT/US2020/033849, dated Jul. 30, 2020 in 14 pages.
International Search Report and Written Opinion of PCT/US2021/053642, dated Feb. 14, 2022 in 15 pages.
Joly-Pottuz et al., "Anti-Wear and Friction Reducing Mechanisms of Carbon Nano-Onions as Lubricant Additives" Tribology Letters, vol. 30, (2008), pp. 69-80.
Kouloumpis et al., "Controlled deposition of fullerene derivatives within a graphene template by means of a modified Langmuir-Schaefer method", Journal of Colloid and Interface Science, vol. 524, Apr. 12, 2018 [retrieved on Jul. 12, 2020]. Retrieved from the Internet: <URL: https://www.rug.nl/research/portal/files/62120570/1_s2 .0_S002197971830434X_main.pdf> . pp. 388-398.
Kuznetsov, et al. "Controllable electromagnetic response of onion-like carbon based materials" Phys. Stat. Sol.; 245(10), 2051-2054 (2008).
Liu, et al. "Functionalization of Carbon Nano-onions by Direct Fluorination" Chem. Mater. 19:778-786 (2007).
Molina-Ontoria et al. "Preparation and Characterization of Soluble Carbon Nano-Onions by Covalent Functionalization, employing a Na—K Alloy," Chem. Comm., vol. 49, (2013) pp. 2406-2408.
Obraztsova, et al., "Raman Identification of Onion-Like Carbon" Carbon, vol. 36, No. 5-6, pp. 821-826 (1998).
Tepliakov, et al., "sp2-sp3-Hybridized Atomic Domains Determine Optical Features of Carbon Dots" ACS Nano; 13:10737-10744 (2019).
Tomita, et al. "Structure and electronic properties of carbon onions" The Journal of Chemical Physics, 114(17), 7477-7482 (2001).
Wu et al., Synthesis of nitrogen-doped onion-like carbon and its use in carbon-based CoFe binary non-precious-metal catalysts for oxygen-reduction, Carbon, vol. 49, May 25, 2011 [retrieved on Jan. 24, 2022]. Retrieved from the Internet: URL: https://www.sciencedirect.com/science/article/abs/pii/S000862231 100399X?via%3Dihub>. pp. 3972-3982.
Xu et al. "Prospects and Research progress in nano onion-like fullerenes" New Carbon Materials, Elsevier, Amsterdam, vol. 23, No. 4, Mar. 1, 2008.

* cited by examiner

ADDITIVE FOR LIQUID FUELS, FUEL COMPOSITIONS BASED ON THE ADDITIVE, AND METHODS OF MANUFACTURE

CLAIM OF PRIORITY

This application is a divisional application from U.S. patent application Ser. No. 17/611,087 filed Nov. 12, 2021, which is a U.S. national stage filing from Int'l Appl. No. PCT/US2020/033849 filed May 20, 2020, which claims the benefit of priority to U.S. Provisional Appl. No. 62/851,375 filed May 22, 2019, each of which is incorporated in its entirety by reference under 37 C.F.R. § 1.57.

BACKGROUND

Field

The present application relates to the field of additives for liquid fuels. More particularly, disclosed herein are nanoparticle-containing additives for mixing with hydrocarbon-based liquid fuels, fuel compositions based on the additives, and methods of manufacture.

Description of the Related Art

Liquid fuels (e.g., hydrocarbon-based liquid fuels, including but not limited to petroleum-based fuels such as gasoline and biofuels such as biodiesel) are used in internal combustion engines and can benefit from improved performance (e.g., improved combustion efficiency; catalytic improvement of the combustion process; increased burning efficiency; improved extreme pressure properties, anti-wear properties, and/or antioxidation properties.

SUMMARY

In certain embodiments, a nanostructure is provided. The nanostructure comprises a plurality of substantially spherically curved carbon layers having diameters in a range of 1 nanometer to 1000 nanometers and a plurality of halogen atoms attached to an outer convex side of the carbon layers.

In certain embodiments, a composition of matter is provided. The composition of matter comprises a liquid fuel and an additive comprising at least one liquid and a plurality of carbon nano-onions.

In certain embodiments, a method of fabricating an additive for liquid fuel is provided. The method comprises creating a carbon-based material using a plasma generated by kilohertz-range, high voltage, pulsed electrical discharges in an environment comprising at least one hydrocarbon gas and/or at least one liquid containing hydrocarbons, organometallic metal-complex, and/or element-organic compounds. The method further comprises evaporating organic material from the carbon-based material. The method further comprises halogenating the carbon-based material. The method further comprises extracting carbon nano-onions from the halogenated carbon-based material.

DETAILED DESCRIPTION

Figure 1A:
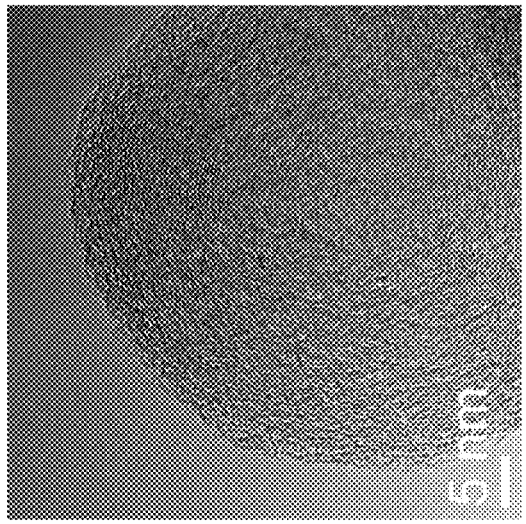
FIGS. 1A-1C are transmission electron microscope (TEM) images of example CNOs comprising agglomerated nanoparticles in accordance with certain embodiments described herein.

Certain embodiments described herein provide an additive for liquid fuels, manufacture techniques for the additive, and/or fuel compositions comprising the additive and the liquid fuel. Examples of the liquid fuel comprise, but are not limited to: hydrocarbon fuel, motor fuel, bio-ethanol fuel, bio-diesel fuel, ethanol, ground transport fuel, airplane fuel, rail transport fuel, marine transport fuel, rocket fuel, and mixtures of fuels. In comparison with the fuel without the additive, certain embodiments described herein advantageously provide a combination of the fuel and the additive that exhibits at least one of: a catalytic improvement of the combustion process of the fuel, an increase in the burning efficiency of the fuel, and improvement of one or more properties of the fuel, including but not limited to: extreme pressure properties, anti-wear properties, and antioxidation properties of the liquid fuel. For example, in certain embodiments, the combination of the fuel and the additive can provide one or more of the following improvements, as compared to the fuel without the additive:

Increase the engine efficiency by up to 15%;
Save fuel by up to 15%;

Reduce greenhouse gases (e.g., unburnt hydrocarbons by up to 50%);

Reduce particulate matter;

Reduce engine friction by up to 80% (e.g., up to 10%).

Certain embodiments described herein advantageously reduce fuel consumption by 3% to 20%, as compared to fuel consumption of the liquid fuel without the additive. Certain embodiments described herein advantageously increase the efficiency of fuel combustion by up to 50%, as compared to fuel combustion of the liquid fuel without the additive. Certain embodiments described herein advantageously reduce certain greenhouse gas emissions by up to 50%, as compared to the liquid fuel without the additive. Certain embodiments described herein advantageously reduce the loss of energy (e.g., obtained from combusting fuel in an engine) by reducing friction between the cylinders and pistons of the engine burning the fuel composition including the additive, as compared to the engine burning the liquid fuel without the additive.

Hereinafter, specific embodiments of the present disclosure will now be described in more detail. The embodiments may, however, be represented in many different forms and should not be construed as being limited to the specific embodiments set forth herein. Rather, these specific embodiments are provided so that this disclosure will be thorough and complete, and will fully convey the scope of the embodiments to those skilled in the art.

Nanostructure

In certain embodiments, the fuel composition comprises a liquid fuel (e.g., a main or base quantity of liquid fuel) and at least one additive comprising halogen-derived spherical carbon-based nanoparticles (e.g., having diameters in a range of 1 nanometer to 1000 nanometers) that are multi-layer, "fullerene-like" spherical nano-sized carbon clusters. For example, the multi-layer carbon-based nanoparticles can be described as being "carbon nano-onions" (CNOs) (see, e.g., Marta E. Plonska-Brzezinska, *"Carbon Nano-Onions: A Review of Recent Progress in Synthesis and Applications,"* ChemNanoMat, Vol. 5, Issue 5, https://doi.org/10.1002/cnma.201800583 (2018)). Other examples of the multi-layer carbon-based nanoparticles in accordance with various embodiments described herein include, but are not limited to: nested fullerenes; multi-layer fullerenes (see, e.g., L. Zhou et al., *"Facile Functionalization of Multilayer Fullerenes (Carbon Nano-Onions) by Nitrene Chemistry and "Grafting From" Strategy,"* Chemistry, 15(6):1389-96 (2009)); giant fullerenes (see, e.g., B. S. Xu, *"Prospects and research progress in nano onion-like fullerenes,"* J. New Carbon Materials, 23:289-301(2008)); spheres or carbon spheres (see, e.g., D. Ugarte, *"Curling and Closure of Graphitic Networks Under Electron-Beam Irradiation,"* Nature 359:707 (1992); Y. Xia et al., *"Monodispersed Colloidal Spheres: Old Materials with New Applications."* Adv. Mater. 12:693 (2000)); horns (see, e.g., J. Du et al., *"Carbon onions synthesized via thermal reduction of glycerin with magnesium."* Mater. Chem. Phys. 93:178 (2005)); flasks (see, e.g., R. K. Rana and A. Cadanken, *"Carbon Nanoflask: A Mechanistic Elucidation of Its Formation,"* J. Phys. Chem. B 106:9769 (2002)); ribbons (see, e.g., J.-S. Lee et al., *"Carbon nanosheets by the graphenization of ungraphitizable isotropic pitch molecules,"* Carbon 121; 479-489 (2017)); carbon nanosphere balls; carbon beads; carbon black; mesoporous beads; carbon onions (see, e.g., M. Rizwan et al., *"A highly sensitive electrochemical detection of human chorionic gonadotropin on a carbon nano-onions/ gold nanoparticles/polyethylene glycol nanocomposite modified glassy carbon electrode,"* Journal of Electroanalytical Chemistry, 833; 462-470 (2018)); "bulbs under carbon-fiber;" "nano buttons of roses" (e.g., imperfect carbon nano-onions that contain non-closed, unlocked carbon and graphene rings). Since there is no single nomenclature for naming these multi-layer carbon-based nanoparticles, the multi-layer carbon-based nanoparticles in accordance with various embodiments described herein are referred to interchangeably as carbon nano-onions (CNOs) and multi-layer fullerenes.

In certain embodiments, the CNOs have an inner carbon core and a shell comprising a plurality of graphene layers (e.g., amorphous and/or ordered layers). The CNOs of certain embodiments have one or more of the following attributes:

Layered structure that are not perfectly spherical;

Concentric carbon layers;

Non-concentric carbon layers;

Amorphous nanostructure; and/or

Solid spherules with irregular shapes.

Figure 1B:
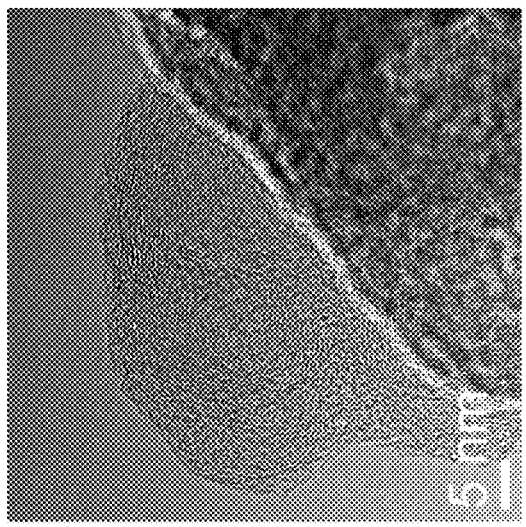
Figure 1C:
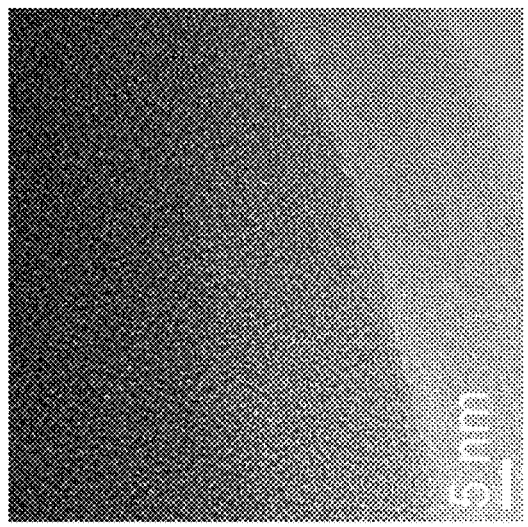

For example, the CNOs of certain embodiments comprise both concentric layers and amorphous nanostructure. FIGS. 1A-1C are transmission electron microscope (TEM) images of example CNOs comprising agglomerated nanoparticles in accordance with certain embodiments described herein. In FIG. 1A, individual CNO particles can be seen within the agglomerated mass with layered concentric structure. In FIG. 1B, carbon layers can be seen which are not perfectly circular. In FIG. 1C, amorphous structure can be seen.

In certain embodiments, the multi-layer carbon-based nanoparticles comprise a plurality of layers that are not perfect or full spheres (e.g., one or more of the layers is a curved, partial fullerene). In certain embodiments, one or more layers of the plurality of layers are locked together (e.g., at least one of the layers trapped within a region at least partially bounded by at least one other of the layers), while in certain other embodiments, one or more layers of the plurality of layers are not locked together (e.g., at least one of the layers within but not trapped within a region at least partially bounded by at least one other of the layers; a cabbage-like structure).

The CNOs of certain embodiments can be denoted by "CNO Halogen 2x" and comprise two halogen atoms per connection between carbon atoms, the halogen atoms attached to an outer convex side of the CNO. For example, the CNO Halogen 2x nanoparticles of certain embodiments can have a width (e.g., diameter) of 20 nanometers and can comprise less than 1000 halogen atoms. The halogen atoms of the CNO Halogen 2x nanoparticles of certain embodiments can be selected from the group consisting of: chlorine, fluorine, bromine, and iodine. The CNOs of certain embodiments comprise nitrogen compounds or sulfur compounds.

In certain embodiments, at least some of the CNOs each further comprise at least one non-carbon and non-halogen atom and can be denoted by "CNO (Elm)n Halogen 2x," where n denotes the number of non-carbon and non-halogen atoms The at least one non-carbon and non-halogen atom can be selected from the group consisting of: Group 1 metal elements; Group 2 metal elements; Group 3 metal elements; Group 4 metal elements; Group 5 metal elements; Group 6 metal elements; Group 7 metal elements; Group 8 metal elements; and combinations of two or more thereof. Examples of the at least one non-carbon and non-halogen atoms include, but are not limited to: Li, K, Cu, Ag, Au, Mg, Ca, Zn, Cd, Al, Sn, Pb, Ti, Mo, W, Fe, Co, Ni, Rh, Pd, Pt, U, and combinations of two or more thereof. For example, CNO (Elm)n Halogen 2x nanoparticles comprising Fe can have a width (e.g., diameter) of 20 nanometers and can comprise 50 to 100 Fe atoms (e.g., 50 to 250 Fe atoms; 50 to 500 Fe atoms; 100 to 1000 Fe atoms). In certain embodiments, at least some of the CNOs are exohedral (e.g., the at least one non-carbon and non-halogen atom is within a region at least partially bounded by a concave side of the CNO), while in certain other embodiments, the CNOs are endohedral (e.g., the at least one non-carbon and non-halogen atom is attached to the outer convex side of the carbon nano-onion). In certain other embodiments, the at least one non-carbon and non-halogen atom is between adjacent carbon layers of the CNO.

The CNOs of certain embodiments are products of chemical modification of carbon spherical nano-sized particles (e.g., CNOs and CNOs having at least one non-carbon and non-halogen atom) by halogens. In certain embodiments, at least some of the CNOs are similar to spherical multilayered fullerene structures but are less structured and less perfectly shaped as compared to spherical multilayered fullerene structures. For example, the multilayers of the CNO can have centers of curvature that are concentric with one another and/or the CNO can comprise a fullerene molecule substantially surrounded by a plurality of substantially spherically curved graphene layers (e.g., the fullerene molecule represents an inner spherical core of the multi-layer fullerene, surrounded by concentrated graphene layers in the form of spheres). In certain such examples, the at least one non-carbon and non-halogen atom is contained inside the CNO (e.g., between the layers of graphene or inside the center region of the CNO).

In certain embodiments, the nanostructure (e.g., CNO) comprises a plurality of substantially spherically curved carbon layers having widths (e.g., diameters) in a range of 1 nanometer to 1000 nanometers (e.g., in a range of 1 nanometer to 500 nanometers; in a range of 1 nanometer to 100 nanometers). The nanostructure further comprises a plurality of halogen atoms (e.g., less than 1000 halogen atoms in a nanostructure having a size of 20 nanometers; the halogen atoms selected from the group consisting of: chlorine, fluorine, bromine, and iodine), the plurality of halogen atoms attached to an outer convex side of the carbon layers. For example, the nanostructure can comprise a CNO having a width (e.g., diameter) of 20 nanometers and a number of halogen atoms in a range of 200 to 4000 halogen atoms (e.g., in a range of 200 to 2000 halogen atoms; in a range of 500 to 800 halogen atoms).

For example, the nanostructure of certain embodiments (e.g., CNO (Elm)n Halogen 2x) comprises a CNO with the plurality of halogen atoms in exohedral positions (e.g., on the outer convex side of the CNO) and with one or more non-carbon and non-halogen atoms within the CNO (e.g., within a region at least partially bounded by an inner concave side of the CNO). For another example, the nanostructure of certain embodiments (e.g., CNO Halogen 2x) comprises a CNO with the plurality of halogen atoms in exohedral positions (e.g., on the outer convex side of the CNO) and without one or more non-carbon and non-halogen atoms within the CNO (e.g., within a region at least partially bounded by an inner concave side of the CNO).

Example Nanostructures

In an example nanostructure in accordance with certain embodiments described herein (e.g., CNO (Elm)n Halogen 2x), the at least one non-carbon and non-halogen atom (Elm) comprises iron (Fe) atoms and the nanostructure has a weight percentage of iron in a range of 2% to 30%, the plurality of halogen atoms (Halogen 2x) comprises bromine (Br) and the nanostructure has a weight percentage of bromine in a range of 2% to 60%, and the widths (e.g., diameters) of the carbon layers (CNO) are in a range of 2 nanometers to 45 nanometers with a Gaussian distribution width of less than 20 nanometers.

Figure 2A:
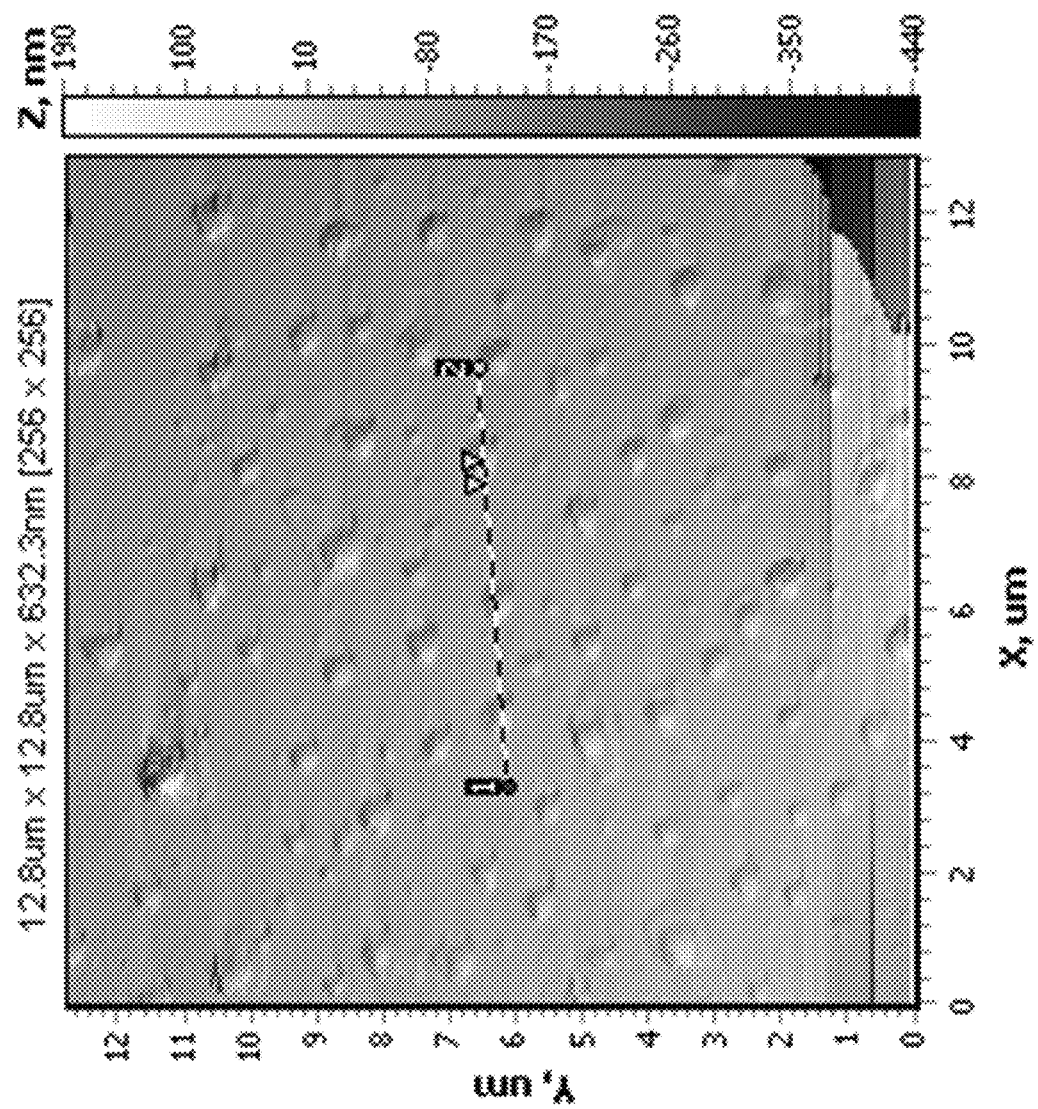
FIG. 2A illustrates an atomic force microscopy (AFM) top-view image of a surface comprising CNO FeBr nanoparticles in accordance with certain embodiments described herein.
Figure 2B:
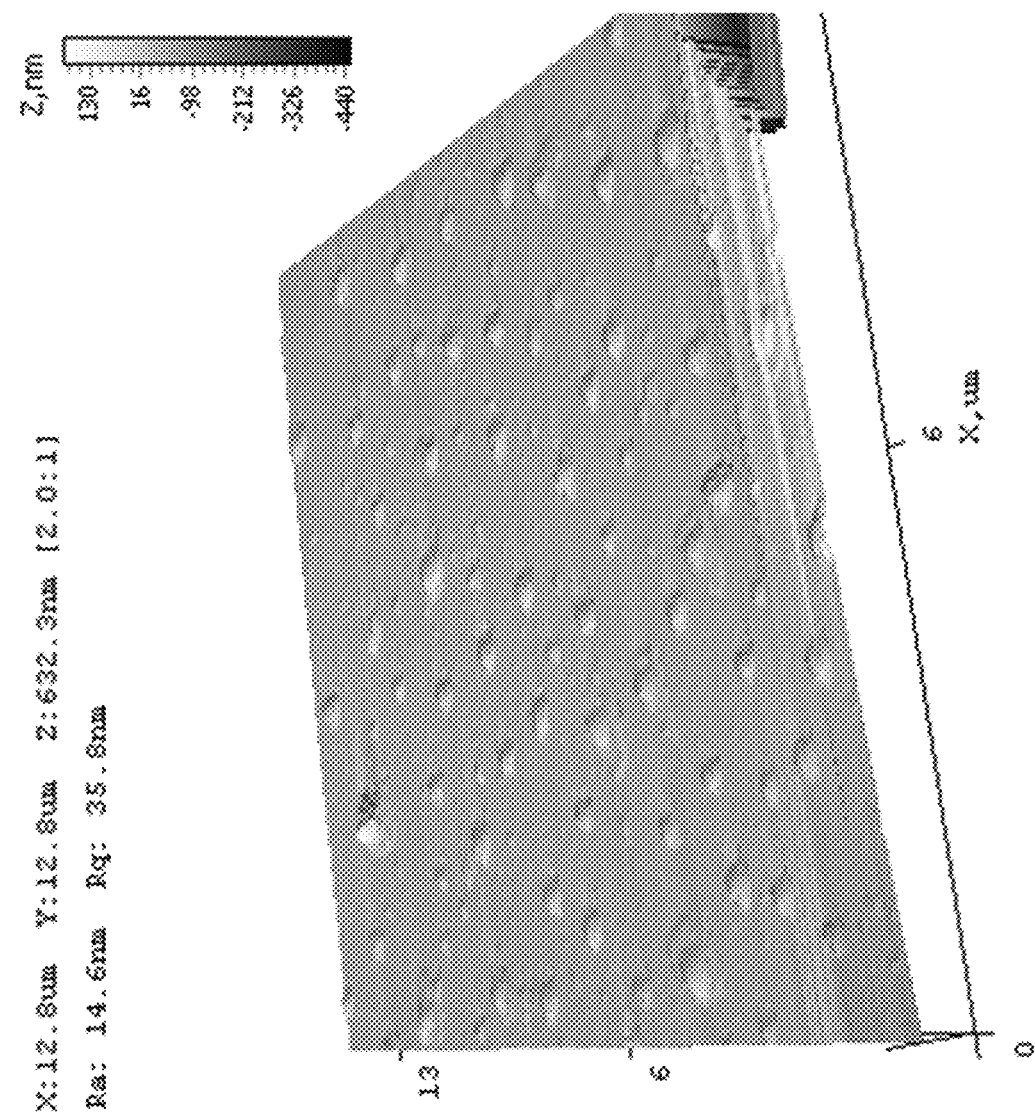
FIG. 2B illustrates an AFM perspective-view image of the surface of FIG. 2A.
Figure 2C:
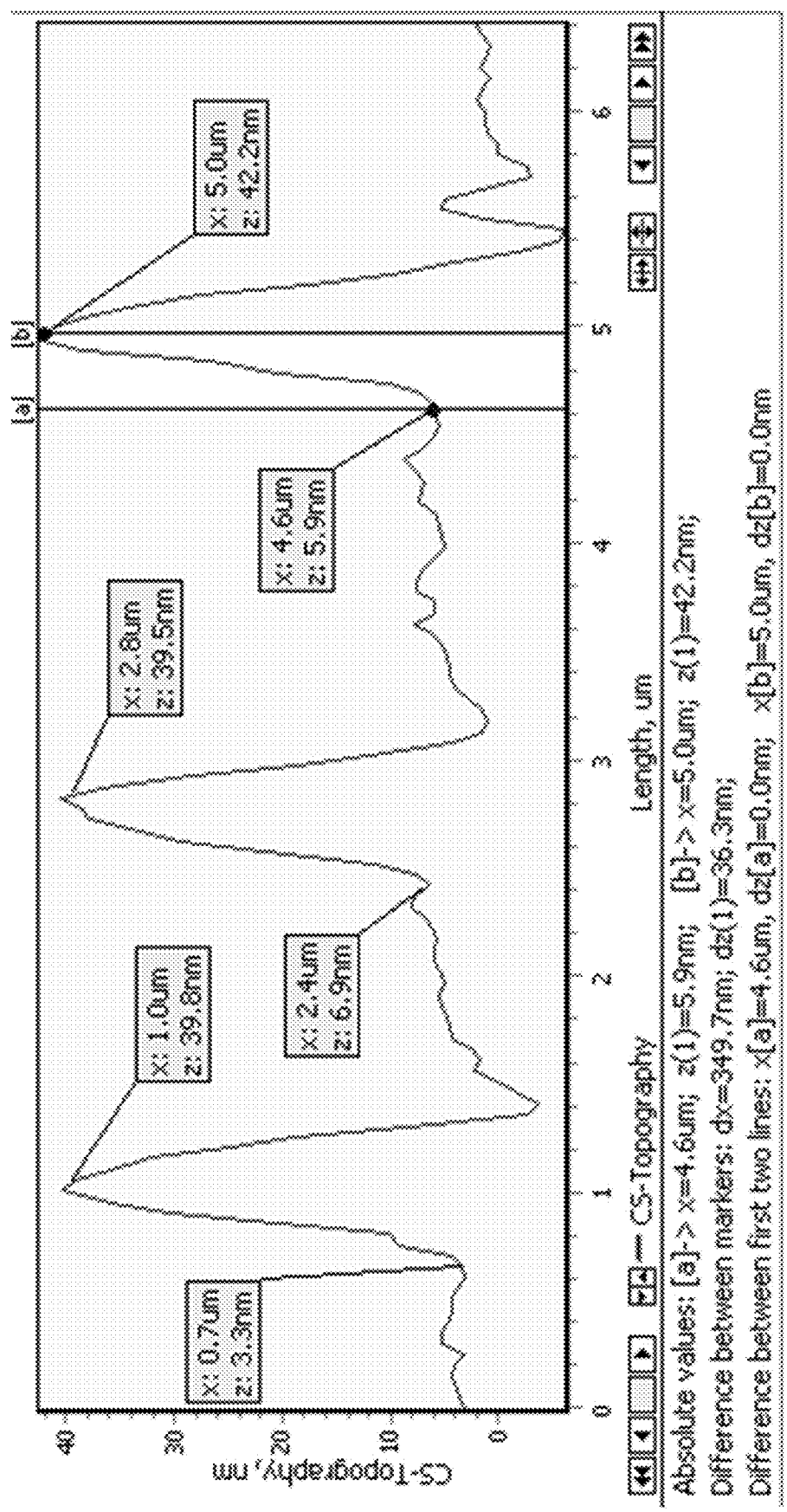
FIG. 2C illustrates an AFM line scan corresponding to the dashed line of FIG. 2A.

FIG. 2A illustrates an atomic force microscopy (AFM) top-view image of a surface comprising CNO (Elm)n Halogen 2x nanoparticles in which the non-carbon and non-halogen atoms are Fe and the halogen atoms are Br (denoted as "CNO FeBr") nanoparticles in accordance with certain embodiments described herein. FIG. 2B illustrates an AFM perspective-view image of the surface of FIG. 2A and FIG. 2C illustrates an AFM line scan corresponding to the dashed line of FIG. 2A. The AFM line scan of FIG. 2C shows three CNO FeBr nanoparticles having sizes (e.g., diameters) of 36.5 nanometers, 32.7 nanometers, and 36.3 nanometers, respectively.

Figure 3A:
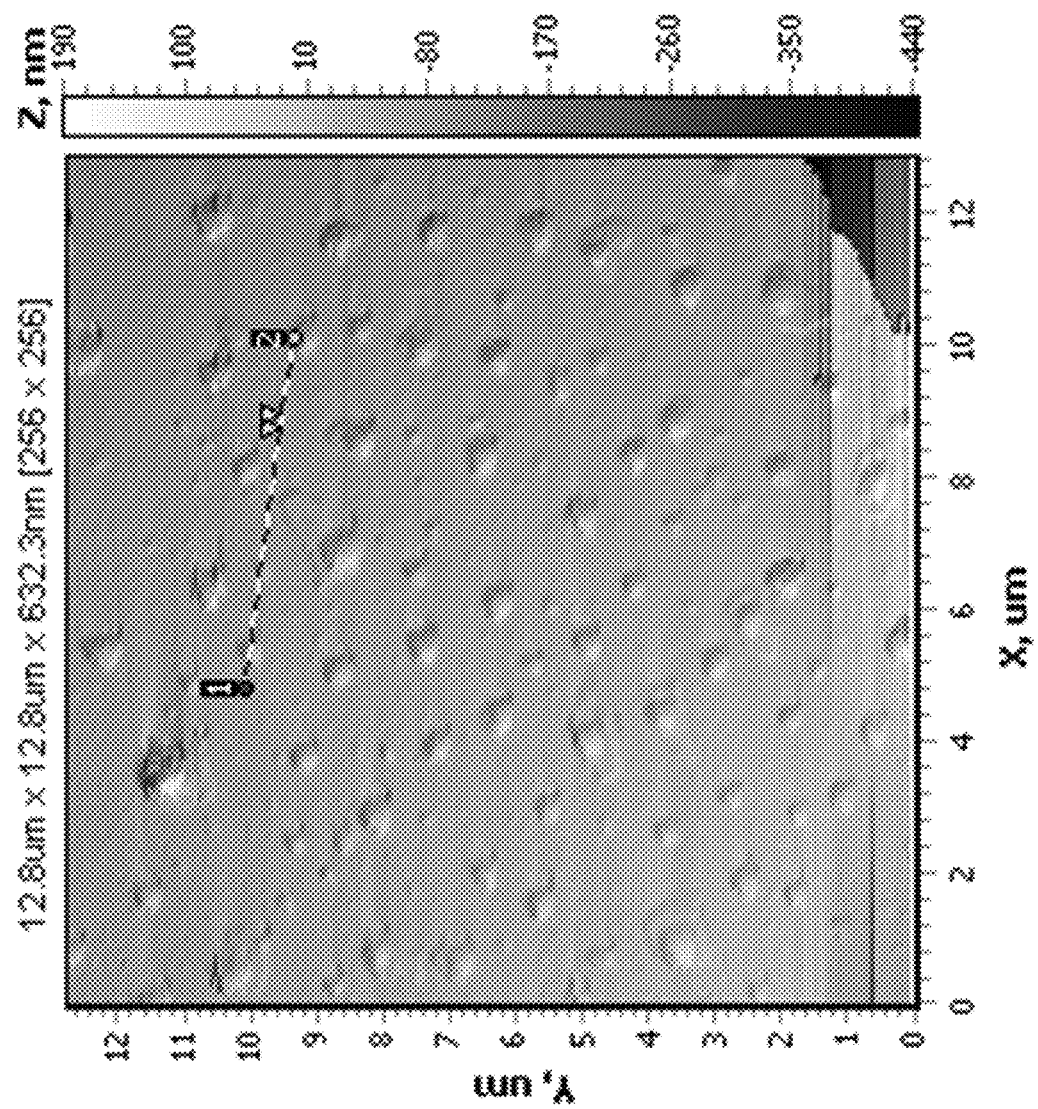
FIG. 3A illustrates an AFM top-view image of a surface comprising CNO FeBr nanoparticles in accordance with certain embodiments described herein.
Figure 3B:
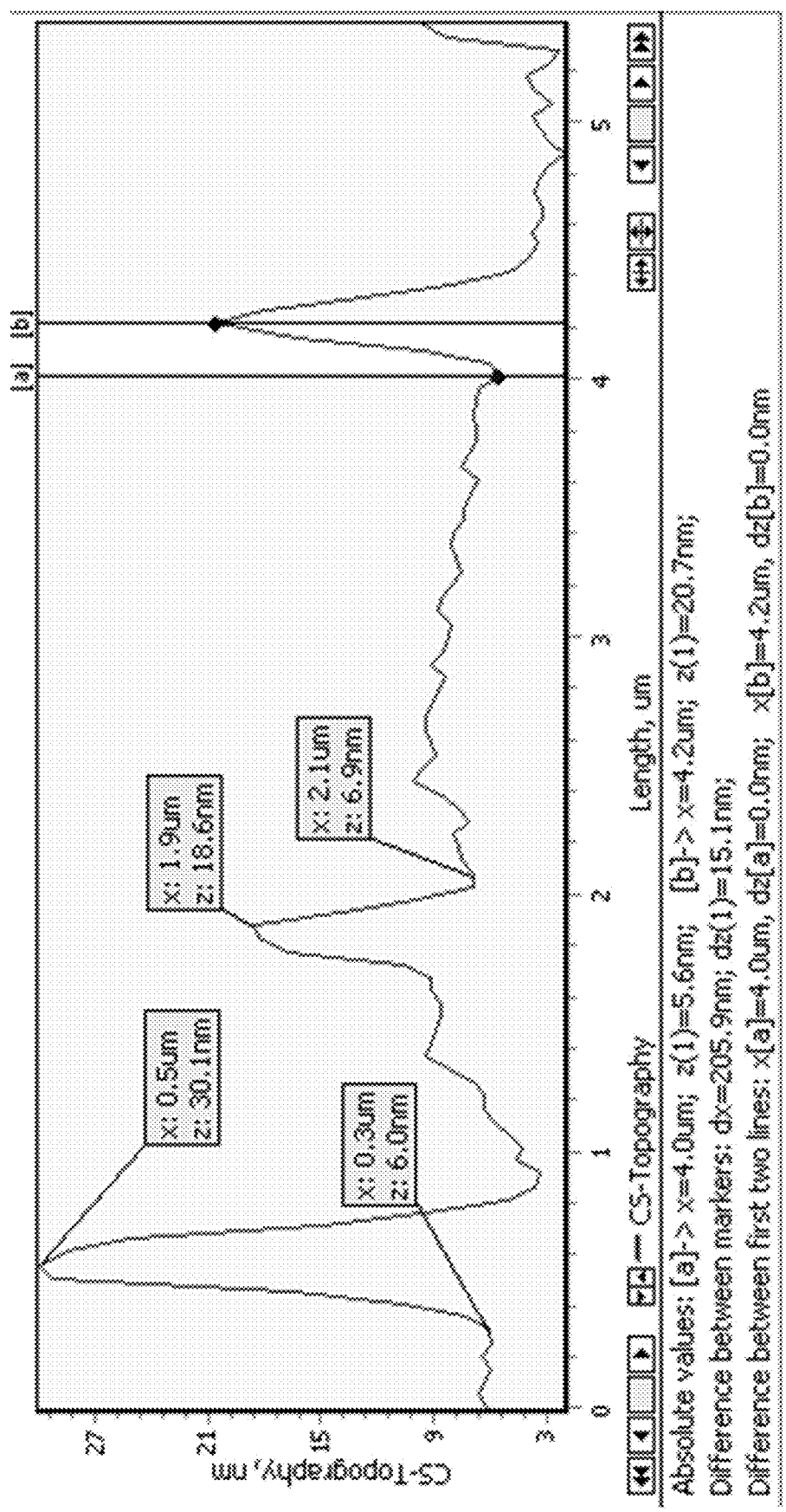
FIG. 3B illustrates an AFM line scan corresponding to the dashed line of FIG. 3A.

FIG. 3A illustrates an AFM top-view image of a surface comprising CNO FeBr nanoparticles in accordance with certain embodiments described herein. FIG. 3B illustrates an AFM line scan corresponding to the dashed line of FIG. 3A. The AFM line scan of FIG. 3B shows three CNO FeBr nanoparticles having sizes (e.g., diameters) of 24.1 nanometers, 11.8 nanometers, and 15.1 nanometers, respectively.

Figure 4A:
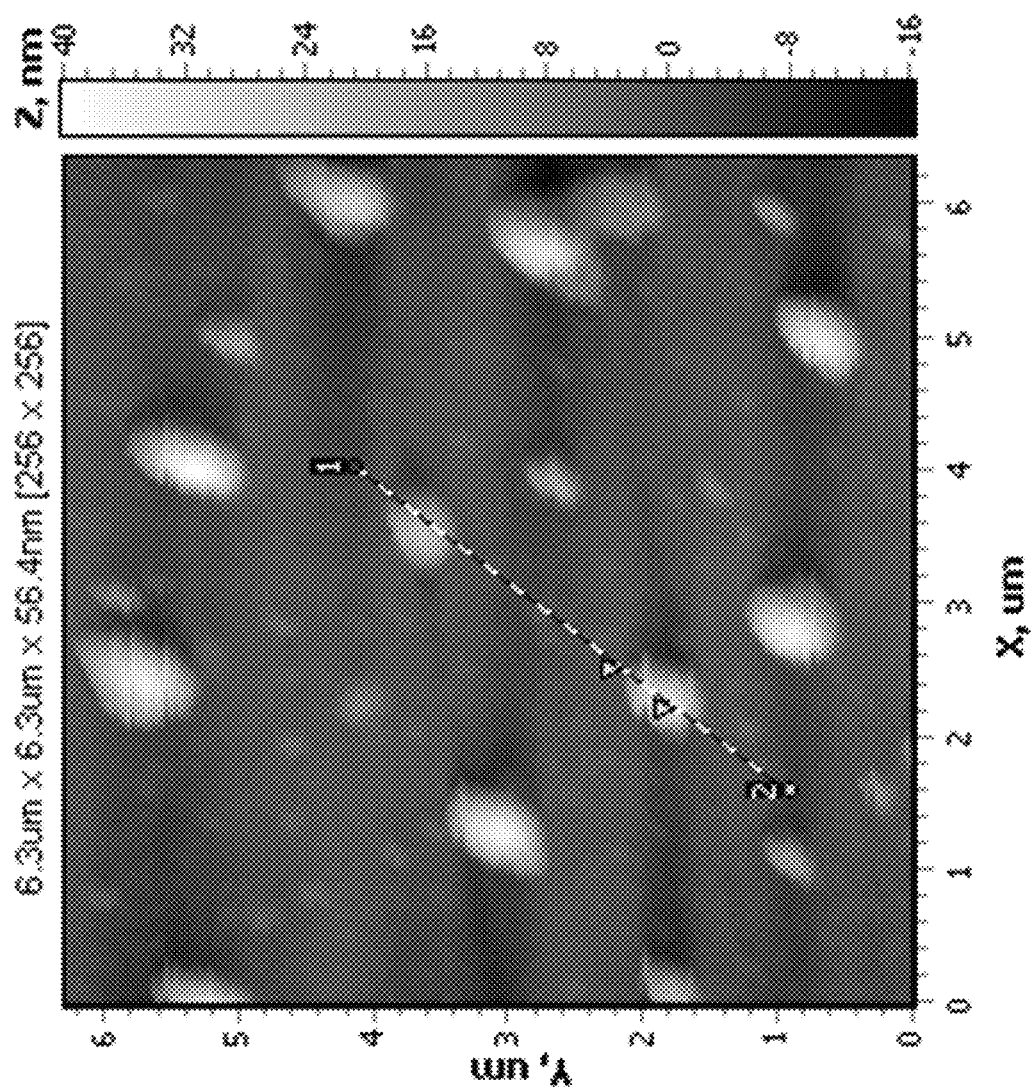
FIG. 4A illustrates an AFM top-view image of a surface comprising CNO FeBr nanoparticles in accordance with certain embodiments described herein.
Figure 4B:
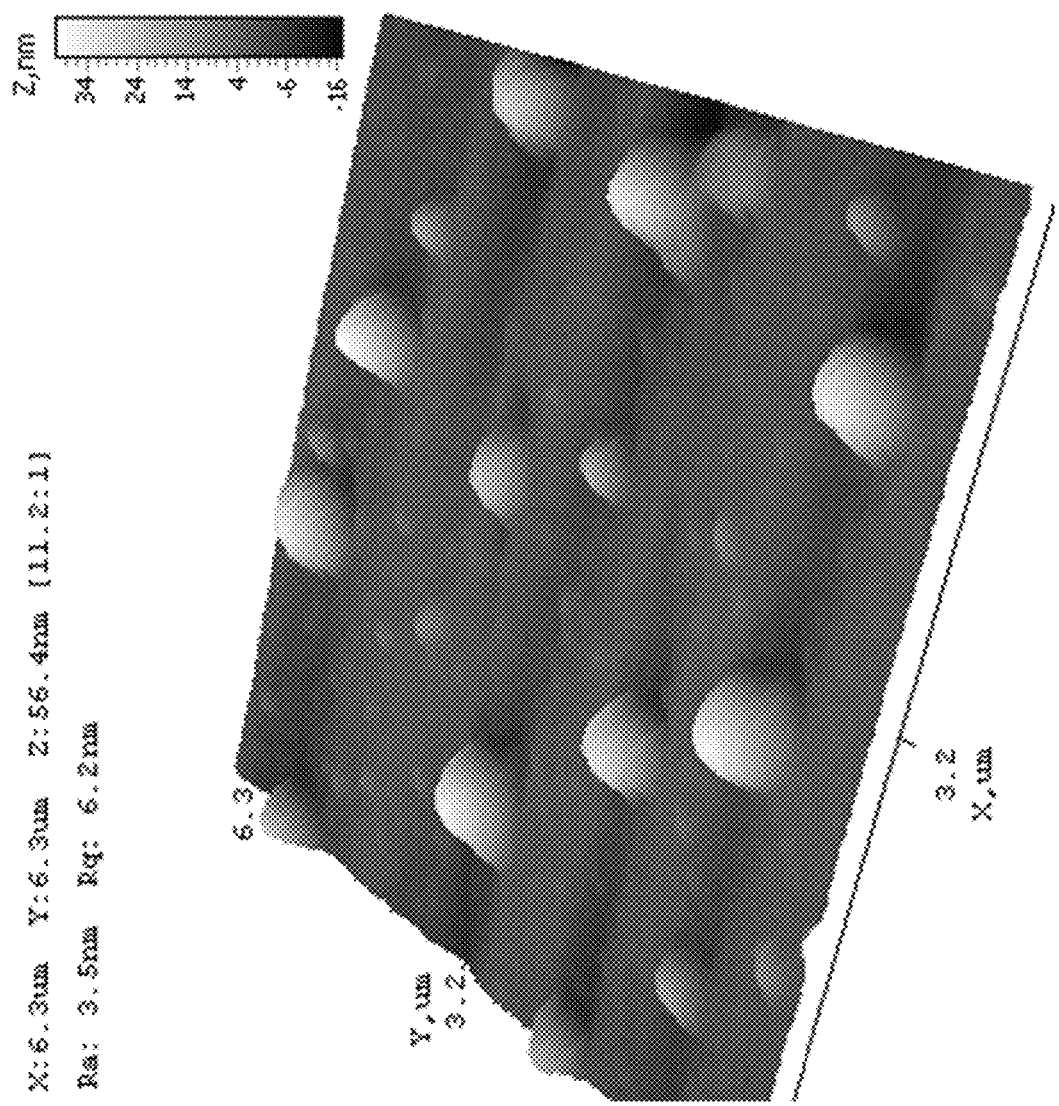
FIG. 4B illustrates an AFM perspective-view image of the surface of FIG. 4A.
Figure 4C:
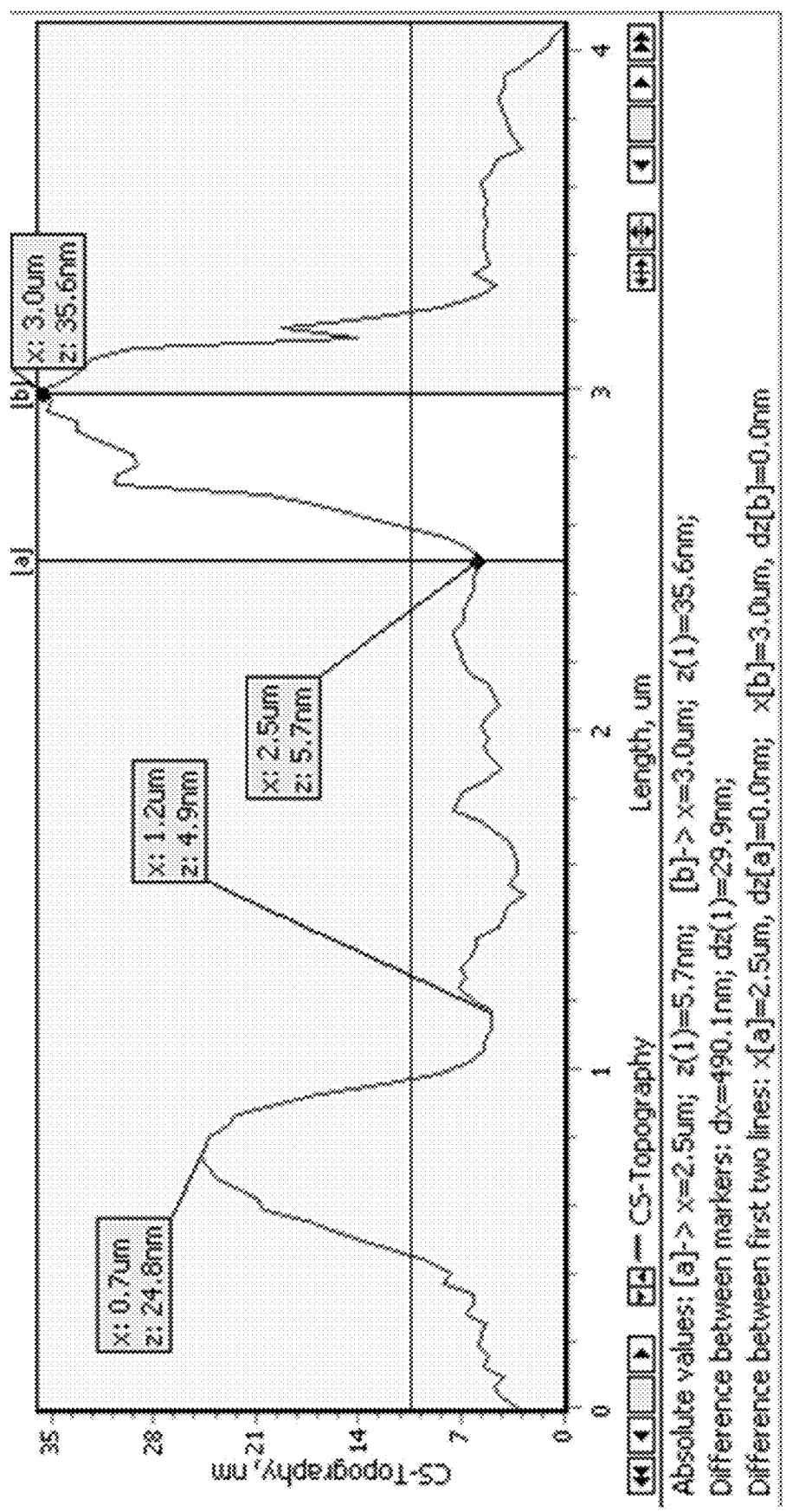
FIG. 4C illustrates an AFM line scan corresponding to the dashed line of FIG. 4A.

FIG. 4A illustrates an AFM top-view image of a surface comprising CNO FeBr nanoparticles in accordance with certain embodiments described herein. FIG. 4B illustrates an AFM perspective-view image of the surface of FIG. 4A and FIG. 4C illustrates an AFM line scan corresponding to the dashed line of FIG. 4A. The AFM line scan of FIG. 4C shows two CNO FeBr nanoparticles having sizes (e.g., diameters) of 19.9 nanometers and 29.9 nanometers, respectively.

Figure 5A:
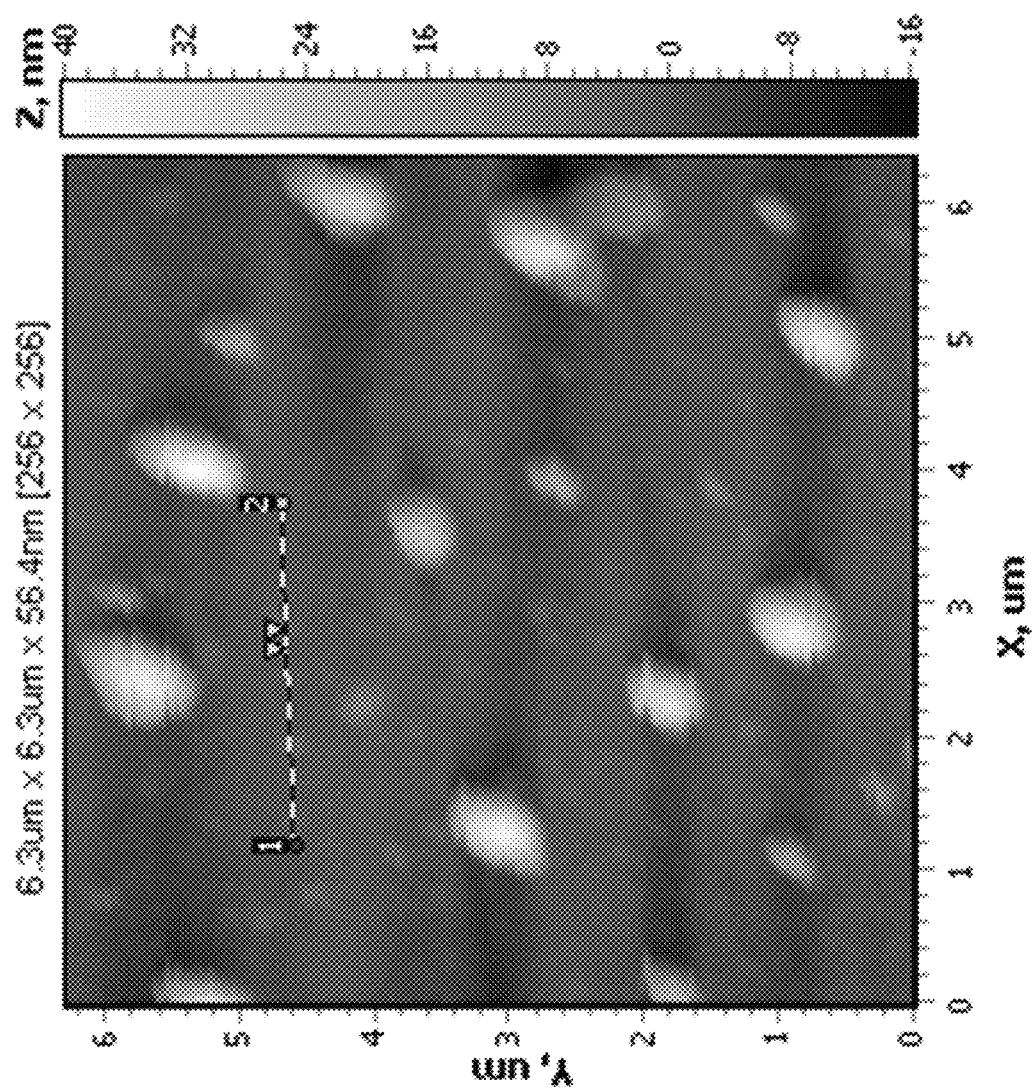
FIG. 5A illustrates an AFM top-view image of a surface comprising CNO FeBr nanoparticles in accordance with certain embodiments described herein.
Figure 5B:
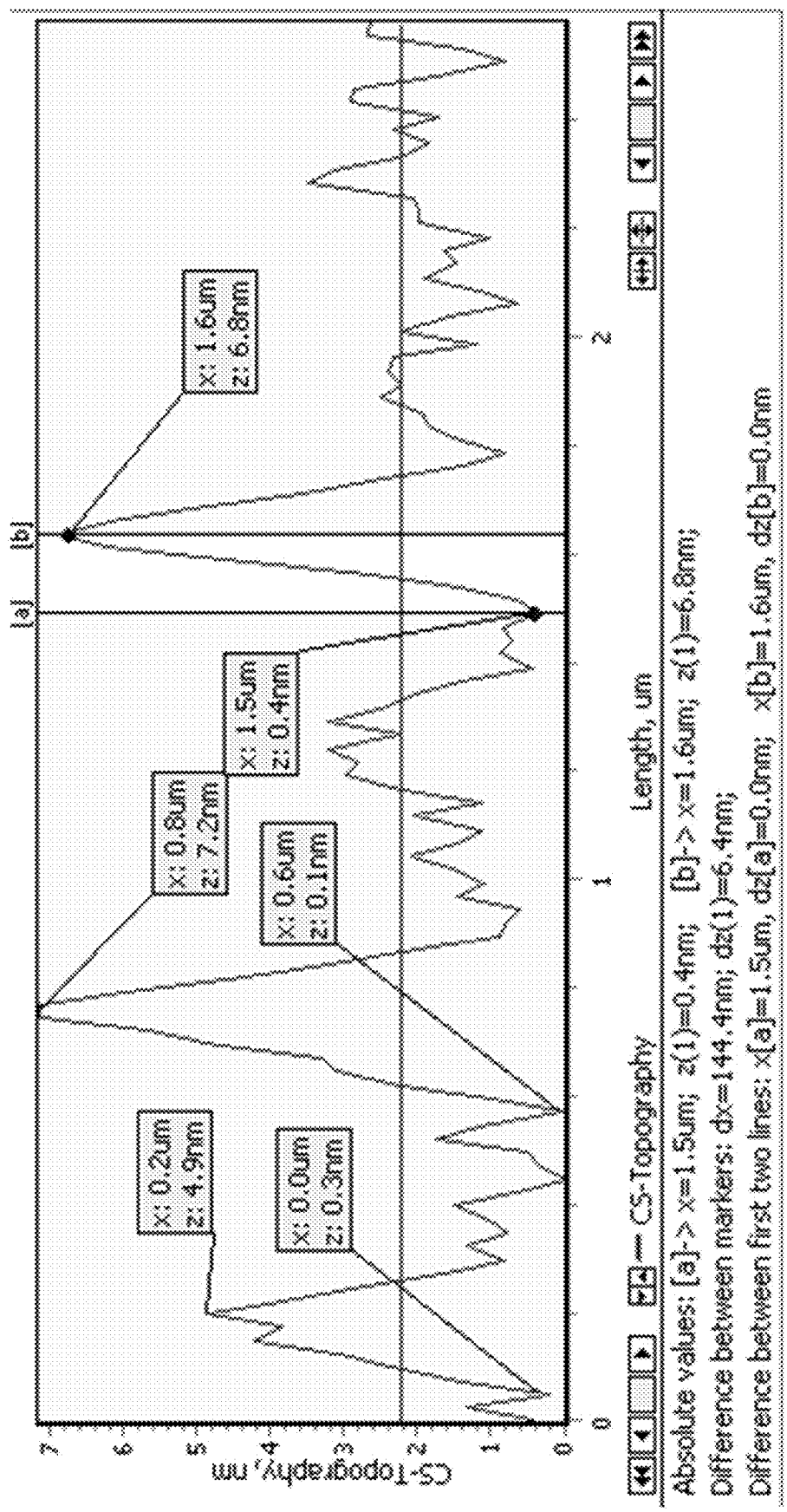
FIG. 5B illustrates an AFM line scan corresponding to the dashed line of FIG. 5A.

FIG. 5A illustrates an AFM top-view image of a surface comprising CNO FeBr nanoparticles in accordance with certain embodiments described herein. FIG. 5B illustrates an AFM line scan corresponding to the dashed line of FIG. 3A. The AFM line scan of FIG. 3B shows three CNO FeBr nanoparticles having sizes (e.g., diameters) of 4.6 nanometers, 7.1 nanometers, and 6.4 nanometers, respectively.

Figure 6:
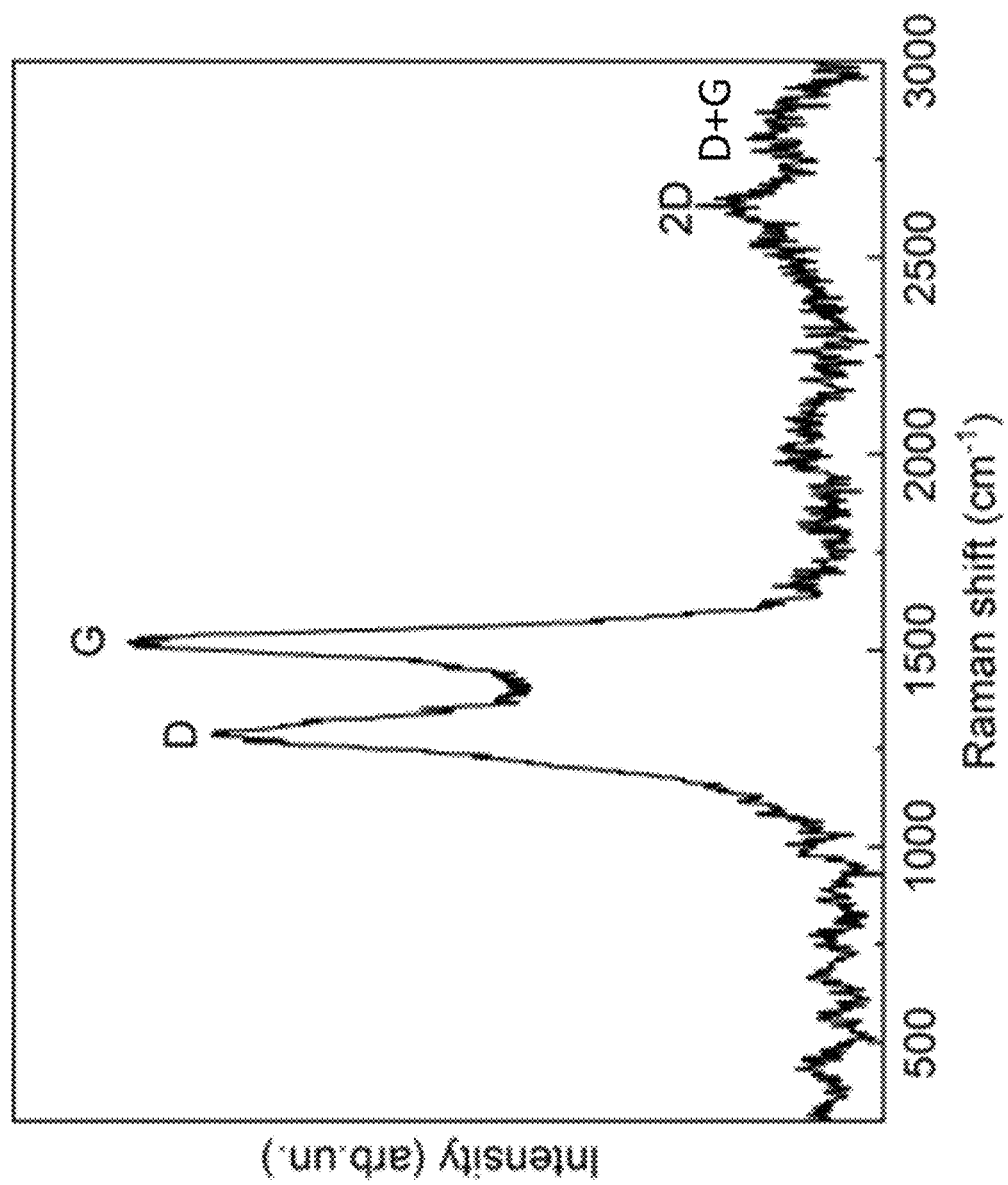
FIG. 6 shows a Raman spectrum from a sample containing carbon particle aggregates in accordance with certain embodiments described herein.

FIG. 6 shows a Raman spectrum from a sample containing carbon particle aggregates in accordance with certain embodiments described herein. The spectrum has four peaks located at about 1340, 1590, 2680, 2930 cm$^{-1}$, respectively. The G band at about 1590 cm$^{-1}$ corresponds to the $E_{2g}$ phonon mode (see, e.g., F. Tuinstra and J. L. Koenig, "Raman spectrum of graphite," Journal of Chemical Physics, 53: 1126-1130 (1970); S. Dresselhaus et al., "Characterizing graphene, graphite, and carbon nanotubes by Raman spectroscopy," Annual Review of Condensed Matter Physics, 1:89-108 (2010); A. C. Ferrari and J. Robertson, "Raman spectroscopy of amorphous, nanostructured, diamond-like carbon, and nanodiamond," Phil. Trans. R. Soc. Lond. A, 362:2477-2512 (2004); A. C. Ferrari, "Raman spectroscopy of graphene and graphite: disorder, electron-phonon coupling, doping and nonadiabatic effects," Solid State Communications, 143:47-57 (2007)). The D peak at about 1340 cm$^{-1}$, is a phonon mode often assigned to tetrahedrally-bonded (sp$^3$) carbon atoms in diamond-like structures. In graphitic structures, the D peak originates from high degree of disorder and defects. The Raman lines are relatively broad, which indicates the strong disorder of the carbon material, which is consistent with HRTEM images. The 2D peak at around 2680 cm$^{-1}$ is a second order phonon mode, which is an overtone of the D band and its appearance indicates the presence of sp$^2$ carbon planes. However, the relatively low intensity and significant broadening of this peak indicates strong disorder. The D+G peak at around 2930 cm$^{-1}$ can be assigned to the sp$^2$ and sp$^3$ C—H stretching vibrations (see, e.g., R. Hawaldar et al., "*Large-area high-throughput synthesis of monolayergraphene sheet by Hot Filament Thermal Chemical Vapor Deposition*," Sci. Rep., 2:682 (2012); R. Podila et al., "*Raman spectroscopy of folded and scrolled graphene*," ACS Nano, 6:5784-5790 (2012); Y. Kawashima and G. Katagiri, "*Fundamentals, overtones, and combinations in the Raman spectrum of graphite*," Physical Review B 52:10053-10059 (1995)). Its broadening is yet another indication of the disorder.

Fuel Composition

In certain embodiments, a fuel composition comprises the liquid fuel (e.g., selected from the group consisting of: hydrocarbon fuel, diesel fuel, bioethanol fuel, biodiesel fuel, methyl-tert-butyl ether, ethyl-tert-butyl ether, gasoline, ethanol, ground transport fuel, airplane fuel, rail transport fuel, marine transport fuel, rocket fuel, and combinations thereof) and the additive comprising at least one liquid and a plurality of carbon nano-onions (e.g., nested fullerenes, multilayer fullerenes, bulbs under carbon-fiber, nano-buttons of roses comprising non-closed, unlocked carbon and graphene rings). For example, the additive can consist essentially of the at least one liquid and the plurality of carbon nano-onions. In certain embodiments, the carbon nano-onions comprise a plurality of halogen atoms per carbon nano-onion (e.g., less than 1000 halogen atoms per carbon nano-onion, the halogen atoms selected from the group consisting of: F, Cl, Br, I) attached to an outer convex side of the carbon nano-onion.

At least some of the carbon nano-onions of certain embodiments have at least one non-carbon and non-halogen atom that is within a region at least partially bounded by an inner concave side of the carbon nano-onion, while at least some of the carbon nano-onions of certain other embodiments have at least one non-carbon and non-halogen atom that is attached to the outer convex side of the carbon nano-onion. The at least one non-carbon and non-halogen atom can be selected from the group consisting of: Group 1 metal elements; Group 2 metal elements; Group 3 metal elements; Group 4 metal elements; Group 5 metal elements; Group 6 metal elements; Group 7 metal elements; Group 8 metal elements; Li; K; Cu; Ag; Au; Mg; Ca; Zn; Cd; Al; Sn; Pb; Ti; Mo; W; Fe; Co; Ni; Rh; Pd; Pt; U; and combinations of two or more thereof.

In certain embodiments, the at least one liquid of the additive comprises one or more aliphatic alcohols (e.g., methanol; ethanol; propanol), benzene, gasoline, toluene, heptane, decane, and/or hexane and the plurality of carbon nano-onions having a concentration in a range of 0.01 gram per liter to 10 grams per liter (e.g., in a range of 0.05 gram per liter to 5 grams per liter; in a range of 0.1 gram per liter to 5 grams per liter; in a range of 0.2 gram per liter to 5 grams per liter; in a range of 0.05 gram per liter to 3 grams per liter; in a range of 0.2 gram per liter to 3 grams per liter; in a range of 0.01 gram per liter to 1 gram per liter; in a range of 0.2 gram per liter to 1 gram per liter; or any range, sub-range, or combinations of ranges between any of these values). In certain embodiments, the at least one liquid of the additive comprises a solvent used in extracting the plurality of carbon nano-onions from halogenated carbon-based material during the fabrication of the plurality of carbon nano-onions. In certain embodiments, the fuel composition comprises the additive and the liquid fuel, the additive having a concentration in a range of 0.5 milliliter per liter of liquid fuel to 50 milliliters per liter of liquid fuel (e.g., in a range of 0.5 milliliter per liter of liquid fuel to 25 milliliters per liter of liquid fuel; in a range of 0.5 milliliter per liter of liquid fuel to 5 milliliters per liter of liquid fuel; in a range of 0.5 milliliter per liter of liquid fuel to 3 milliliters per liter of liquid fuel; in a range of 1 milliliter per liter of liquid fuel to 20 milliliters per liter of liquid fuel; in a range of 2 milliliters per liter of liquid fuel to 10 milliliters per liter of liquid fuel; in a range of 2 milliliters per liter of liquid fuel to 5 milliliters per liter of liquid fuel; in a range of 3 milliliters per liter of liquid fuel to 10 milliliters per liter of liquid fuel; or any range, sub-range, or combinations of ranges between any of these values). In certain embodiments, the fuel composition has a weight percentage of the plurality of carbon nano-onions in a range of 0.0001% to 5% (e.g., in a range of 0.001% to 5%; in a range of 0.0001% to 0.1%, in a range of 0.0001% to 0.5%; or in any range, sub-range, or combination of ranges between any of these values). In certain embodiments, the fuel composition further comprises one or more auxiliary components and has a weight percentage of the one or more auxiliary components in a range of 0.0001% to 85% (e.g., in a range of 0.01% to 15%). In certain embodiments, the liquid fuel is the remainder of the fuel composition.

Example Fuel Compositions

Table 1 illustrates a first example E-90 fuel composition in accordance with certain embodiments described herein.

TABLE 1

| Constituents of the example E-90 fuel composition | Weight percentages of the constituents of the fuel composition |
|---|---|
| Nitrogen-containing organic compounds (aromatic and aliphatic amines) | 0.05 wt. % |
| Stabilizer (e.g., aliphatic alcohols (C3-C6)) | 0.01 wt. % |
| Hydrocarbon fraction (beginning temperature – 185 centigrade of temperature – temperature interval boiling of this fraction) | 10.0 wt. % |
| Halogen derivatives of CNO (Elm)n Halogen 2x or CNO Halogen 2x | 0.0001 wt. % |
| Bioethanol | The rest of the fuel composition |

Table 2 illustrates a second example E-10 fuel composition in accordance with certain embodiments described herein.

TABLE 2

| Constituents of the example E-10 fuel composition | Weight percentages of the constituents of the fuel composition |
|---|---|
| Nitrogen-containing organic compounds (aromatic and aliphatic amines) | 0.05 wt. % |
| Stabilizer (e.g., aliphatic alcohols (C3-C6)) | 0.5 wt. % |
| Hydrocarbon fraction (beginning temperature – 185 centigrade of temperature – temperature interval boiling of this fraction) | 90 wt. % |
| Halogen derivatives of CNO (Elm)n Halogen 2x or CNO Halogen 2x | 0.1 wt. % |
| Bioethanol | The rest of the fuel composition |

In certain embodiments described herein, the nanoparticles of the additives (e.g., CNO Halogen 2x and/or CNO (Elm)n Halogen 2x) catalytically improve the combustion process of all types of fuel, as compared to the fuel without the nanosized additives. In certain embodiments described herein, the nanosized additives advantageously improve the extreme pressure properties, anti-wear, and/or anti-oxidative properties of the fuel, as compared to the fuel without the nanosized additives (e.g., for motor bio-ethanol fuels, non-polar organic fuels, and/or other fuels).

In certain embodiments, the nanoparticles based on halogen derivatives (e.g., CNO (Elm)n Halogen 2×) of the additives advantageously increase extreme pressure and anti-wear properties for compounded motor bioethanol fuel and isooctane from 7% to 80%, as compared to fuel compositions without the nanoparticles and/or advantageously increase the antioxidant properties of benzyl alcohol from 20% to 15 times as compared to without the nanoparticles.

Example Methods of Fabrication

In certain embodiments, a method of fabricating a fuel composition comprising a liquid fuel and the additive comprises supplying a first amount of the liquid fuel (e.g., the primary, main, or base liquid fuel) and a second amount of the additive (e.g., the additive based on halogen derivatives of CNOs, such as CNO Halogen 2× and/or CNO (Elm)n Halogen 2×). In certain embodiments, the method further comprises mixing the first amount of the liquid fuel and the second amount of the additive together (e.g., in a cavitator or other mixer of any type; at room temperature and at atmospheric pressure). In certain embodiments, an evenly distributed mix of the nanoparticles of the additive is achieved inside the liquid fuel.

Figure 7:
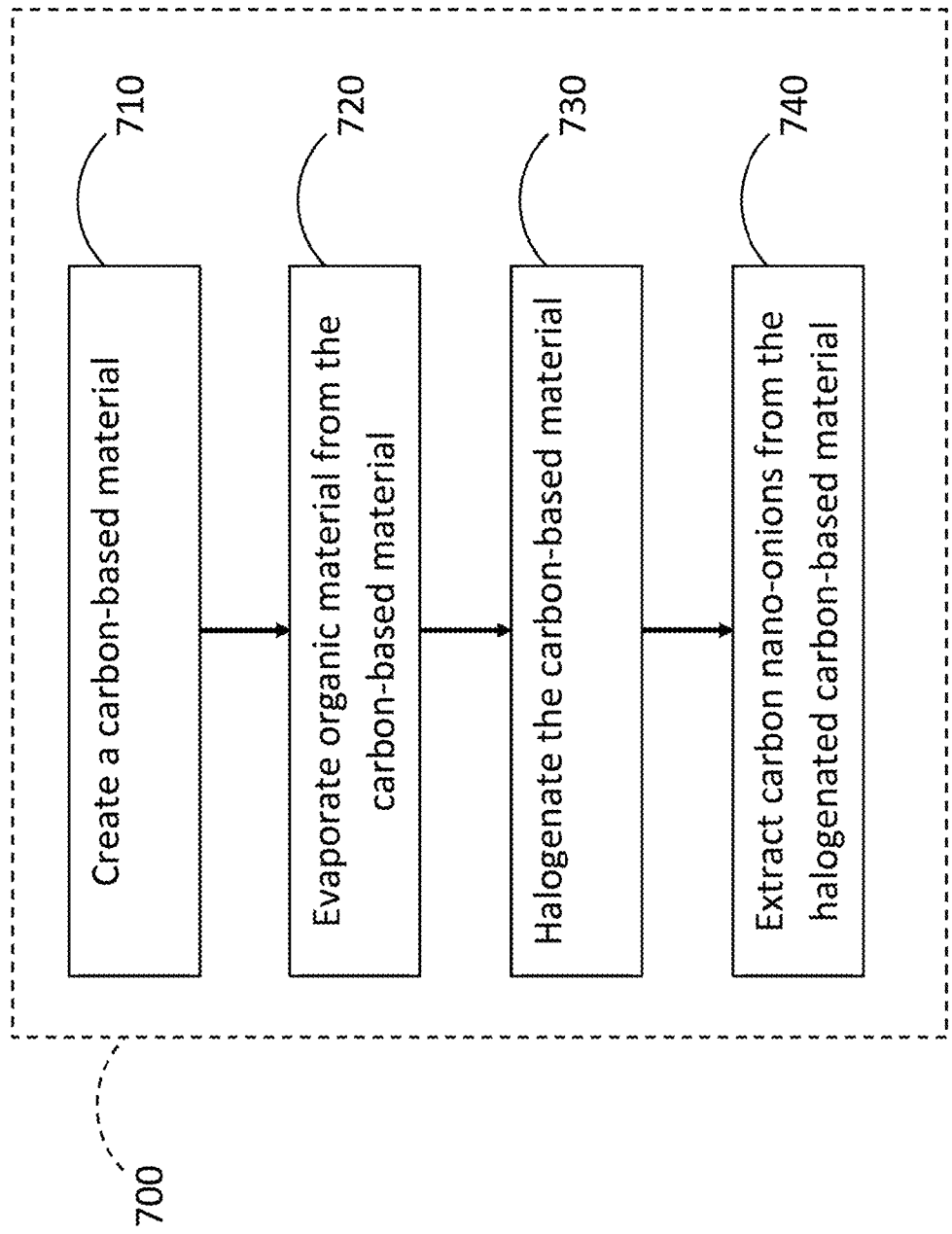
FIG. 7 is a flow diagram of an example method of fabricating an additive for liquid fuel in accordance with certain embodiments described herein.

FIG. 7 is a flow diagram of an example method 700 of fabricating an additive for liquid fuel in accordance with certain embodiments described herein. In certain embodiments, the example method 700 generates CNOs and/or CNOs (Elm) from hydrocarbons in the gas phase and/or uses production installation containing a liquid organic medium to expand the raw material capabilities of the production method and to increase the assortment (e.g., variety) of different nanoparticles generated. In certain embodiments in which the CNOs and/or CNOs (Elm) are poorly soluble in the base liquid fuel (e.g., gasoline) and the solutions are unstable, chemical halogenation of the CNOs and/or CNOs (Elm) is performed (e.g., using bromine or any other halogen). In certain embodiments, the example method extracts the halogenated CNOs and/or CNOs (Elm) using absolutized ethyl alcohol and nano-filtration.

In an operational block 710, the method 700 comprises creating a carbon-based material using a plasma generated by kilohertz-range, high voltage, pulsed electrical discharges in an environment comprising at least one hydrocarbon gas and/or at least one liquid containing hydrocarbons, organo-metallic metal-complex, and/or element-organic compounds. The plasma can be applied to the gas and/or to the at least one liquid.

For example, the at least one hydrocarbon gas can comprise methane, ethane, propane, butane, propene, ethylene, tetrafluoromethane, tetrafluoroethane, and/or any carbon-containing gas supplied to the environment at a temperature in a range of 5 to 120 degrees Celsius with a pressure in a range of 75 to 250 kPa. To create a carbon-based material comprising exohedral nanoparticles, the at least one liquid can comprise a solution of an organometallic compound (e.g., calcium carbide; ferrocene; iron (III) acetylacetonate, nickel hydroxide, Zeiss salt, metal carbonyls) dissolved in a substance (e.g., benzene; gasoline; Kalosha gasoline, hexal, heptane, bromoethane, bromobenzene), with the organometallic compound having a weight percentage in the solution in a range of 0.5% to 50% (e.g., in a range of 0.5% to 10%; in a range of 1% to 20%; in a range of 5% to 50%; or in any range, sub-range, or combination of ranges between any of these values).

Figure 8:
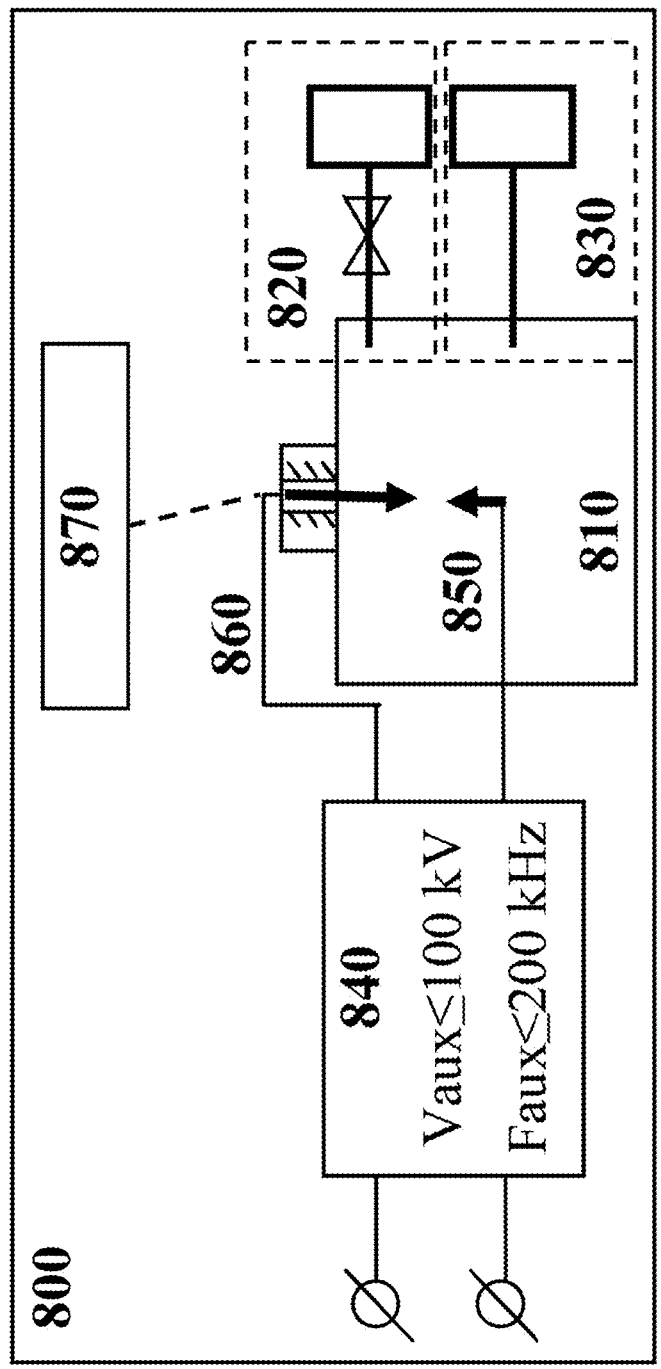
FIG. 8 schematically illustrates an example apparatus for fabricating the carbon-based material in accordance with certain embodiments described herein.

FIG. 8 schematically illustrates an example apparatus 800 for fabricating the carbon-based material in accordance with certain embodiments described herein. The apparatus 800 is configured to fabricate the nanoparticles using the high-frequency, discharge pulse method which creates a non-equilibrium (e.g., unbalanced) plasma produced by high frequency (e.g., kilohertz range), short, high-voltage pulse discharges within an environment comprising at least one hydrocarbon gas and/or at least one liquid comprising hydrocarbons, at least one organometallic, metal-complex compound, and/or at least one element-organic compound (e.g., dissolved in at least one organic solvent, examples of which include but are not limited to: aliphatic and aromatic hydrocarbons, ethers, alcohols, ketones, and organic amines and amides).

In certain embodiments, the non-equilibrium (e.g., uneven) plasma, which is generated by discharges with kilohertz frequency of repetition, brings into the process of synthesis large volumes (e.g., quantities) of gaseous or liquid chemical substances. For example, the plasma can carry out a volumetric action (e.g., pumping energy) into an environment in which the reaction takes place. The raw materials for producing the nanocarbon materials in the gas phase can comprise hydrocarbon gas (e.g., propane and/or butane) for obtaining CNOs without metal or can comprise easily volatile organometallic compounds for obtaining CNOs with metal (e.g., iron).

As schematically shown in FIG. 8, the apparatus 800 comprises a reactor chamber 810 configured to contain the at least one hydrocarbon gas and/or the at least one liquid. The apparatus 800 further comprises at least one source 820 configured to controllably supply the at least one hydrocarbon gas and/or the at least one liquid into the reactor chamber 810. The apparatus 800 further comprises at least one output receptacle 830 configured to receive the carbon-based material fabricated within the reactor chamber 810. The apparatus 800 further comprises at least one source 840 of AC electrical energy in electrical communication with at least one first electrode 850 within the reactor chamber 810 and at least one second electrode 860 within the reactor chamber 810. The at least one second electrode 860 is configured to be moved within the reactor chamber 810 (e.g., by driver 870). The at least one first electrode 850 and the at least one second electrode 860 are configured to apply the AC electrical energy (e.g., voltage less than or equal to 100 kV at a frequency less than or equal to 200 kHz) from the at least one source 840 to the at least one hydrocarbon gas and/or the at least one liquid in the reactor chamber 810. In certain embodiments, the at least one first electrode 850 is configured to be controllably moved within the reactor chamber 810 relative to the at least one second electrode 860 (e.g., which is fixed or configured to not move). In certain embodiments, the at least one first electrode 850 and/or the at least one second electrode 860 comprise an electricity conducting materials, examples of which include but are not limited to: graphite, metals in Groups 1, 2, or 3 of the periodic table, and elements and metals in Groups 4, 5, 6, 7, or 8 of the periodic table. In certain embodiments, the at least one first electrode 850 and/or the at least one second electrode 860 comprise metal-organic compounds and complexes used in the reaction solutions and environment within the reactor chamber 810. For example, the at least one first electrode 850 and/or the at least one second electrode 860 can comprise atoms of the materials which are inside the CNO (Elm) nanoparticles.

In an operational block 720, the method 700 further comprises evaporating organic material from the carbon-based material. For example, evaporating organic material from the carbon-based material can comprise heating the carbon-based material to a temperature in a range of 50 to 300 degrees Celsius (e.g., in a range of 50 to 100 degrees Celsius; in a range of 100 to 120 degrees Celsius; in a range of 120 to 150 degrees Celsius; in a range of 100 to 300 degrees Celsius; in a range of 150 to 300 degrees Celsius; or in any range, sub-range, or combination of ranges between any of these values) at atmospheric pressure.

In an operational block 730, the method 700 further comprises halogenating the carbon-based material. For example, halogenating the carbon-based material can comprise exposing the carbon-based material to at least one halogen-containing material and evaporating excess halogen-containing material from the carbon-based material. In certain embodiments, the method 700 further comprises modifying the carbon-based material using at least one nitrogen compound or at least one sulfur compound. For example, modifying the carbon-based material with either nitrogen compound or sulfur compound can comprise exposing the carbon-based material to at least one nitrogen-containing material or at least one sulfur-containing material and removing excess nitrogen-containing material or excess sulfur-containing material from the carbon-based material.

In an operational block 740, the method 700 further comprises extracting carbon nano-onions from the halogenated carbon-based material. For example, extracting the carbon nano-onions can comprise creating a mixture of the halogenated carbon-based material with a solvent (e.g., benzene; toluene; ethanol; heptane; decane; gasoline; hexane or other solvent that is effective for separating spherical nanoscale carbon-based clusters) and filtering out the carbon nano-onions from the mixture using at least one filter with pore diameters less than 450 nanometers (e.g., less than 250 nanometers; less than 200 nanometers; less than 100 nanometers). In certain embodiments, extracting the carbon nano-onions comprises creating a mixture of the halogenated carbon-based material with a solvent, and the additive comprises the solvent.

In certain embodiments, the resulting fuel composition has a weight percentage of the CNO Halogen 2× and/or CNO (Elm)n Halogen 2× nanoparticles of the additive in a range of 0.0001% to 5% (e.g., in a range of 0.001% to 5%; in a range of 0.0001% to 0.1%, in a range of 0.0001% to 0.5%). In certain embodiments, the fuel composition further comprises one or more auxiliary (e.g., supporting) components and has a weight percentage of the one or more auxiliary components in a range of 0.0001% to 85% (e.g., in a range of 0.01% to 15%). In certain embodiments, the liquid fuel is the remainder of the fuel composition.

For example, for liquid-based fabrication, a solution can comprise a calculated amount of ferrocene ($Fe(C_5H_5)_2$) dissolved in benzene (e.g., containing 1 to 20% of ferrocene and 99% to 80% benzene), and the solution can then be poured into a glass or enameled reactor chamber 810 (e.g., as used in chemical processing of petroleum products) with iron electrodes 850, 860 and an electrical current applied from an electrical energy source 840 (e.g., generator) to create plasma (e.g., voltage in a range of 2 kV to 100 kV, current in a range of 1 mA to 2 A, and a frequency in a range of 2 kHz to 200 kHz) in the solution. In certain embodiments, the electrical energy can be applied for a period in a range of 1 to 10 hours at room temperature and atmospheric pressure. The resultant carbon-based material (e.g. carbon soot), which contains CNO nanoparticles comprising Fe atoms with the iron content in a range of 2 wt % to 25 wt %, and which have magnetic properties. The carbon-based material can be removed from the reactor chamber 810 and dried and cleaned for further treatment as described herein.

For another example, for gas-based fabrication, the at least one hydrocarbon gas can comprise propane and/or butane can be supplied at room temperature and at a pressure of 1.01 atm, and sufficiently high temperatures and pressure (e.g., at levels at which nanocarbon synthesis occurs) can result from a high rate of energy input into the plasma (e.g., which can have a plasma temperature in a range of 10,000-100,000 Celsius).

Whether created by gas-based or liquid-based fabrication, the resultant carbon-based material (e.g., carbon soot) can be dried and cleaned (e.g., using the evaporation method of organic substances by heating in a drying cabinet at a temperature in a range of 100 to 300 degrees Celsius at atmospheric pressure), and halogenation can take place in a chemical reactor. For example, the carbon-based material can be treated with liquid bromine at 30 to 40 degrees Celsius for 10 to 80 hours to activate and modify the CNO nanoparticles.

The excess halogens can be evaporated and the halogenated carbon-based material can be dried and the nanoparticles can be extracted by different solvents (e.g., ethanol). For example, the halogenated carbon-based material can be dried in a vacuum at a temperature of 20 to 120 degrees Celsius for 3 hours to remove moisture and excess halogen (e.g., bromine) which did not react with the CNO nanoparticles. The activated (e.g., halogenated) nanoparticles (e.g., CNO Halogen 2× and/or CNO (Elm)n Halogen 2×) can be dissolved in a solvent (e.g., ethanol or other solvent that is effective for separating spherical nanoscale carbon-based clusters) then extracted by filtering (using nanoparticle filters with diameters of pores no more than 250 to 450 nanometers).

Certain embodiments described herein use chlorinated, fluorinated, and/or brominated CNO and/or CNO(Elm) nanoparticles for additives. In certain embodiments, to obtain nanoscale additives, halogen derivatives of CNO and/or CNO (Elm) nanoparticles, along with alkanol alcohols, are supplied into a chemical reactor for extraction and structure formation.

In certain embodiments, to obtain a solution with CNO and/or CNO (Elm) nanoparticles in absolute ethanol (e.g., containing halogen derivatives of CNO Halogen 2× and/or CNO (Elm)n Halogen 2× nanoparticles at 0.0001 wt. % per 100 ml (79.9 g) of ethanol with a water content of 0.2 wt. %), certain embodiments described herein use 0.0001*0.799=0.000079 g of CNO Halogen 2× and/or CNO (Elm)n Halogen 2× nanoparticles The resulting nanoscale additives can be mixed with the liquid fuel (e.g., also with any auxiliary components) for processing in any type of mixer to obtain the finished fuel composition.

Example Measurements

Figure 9:
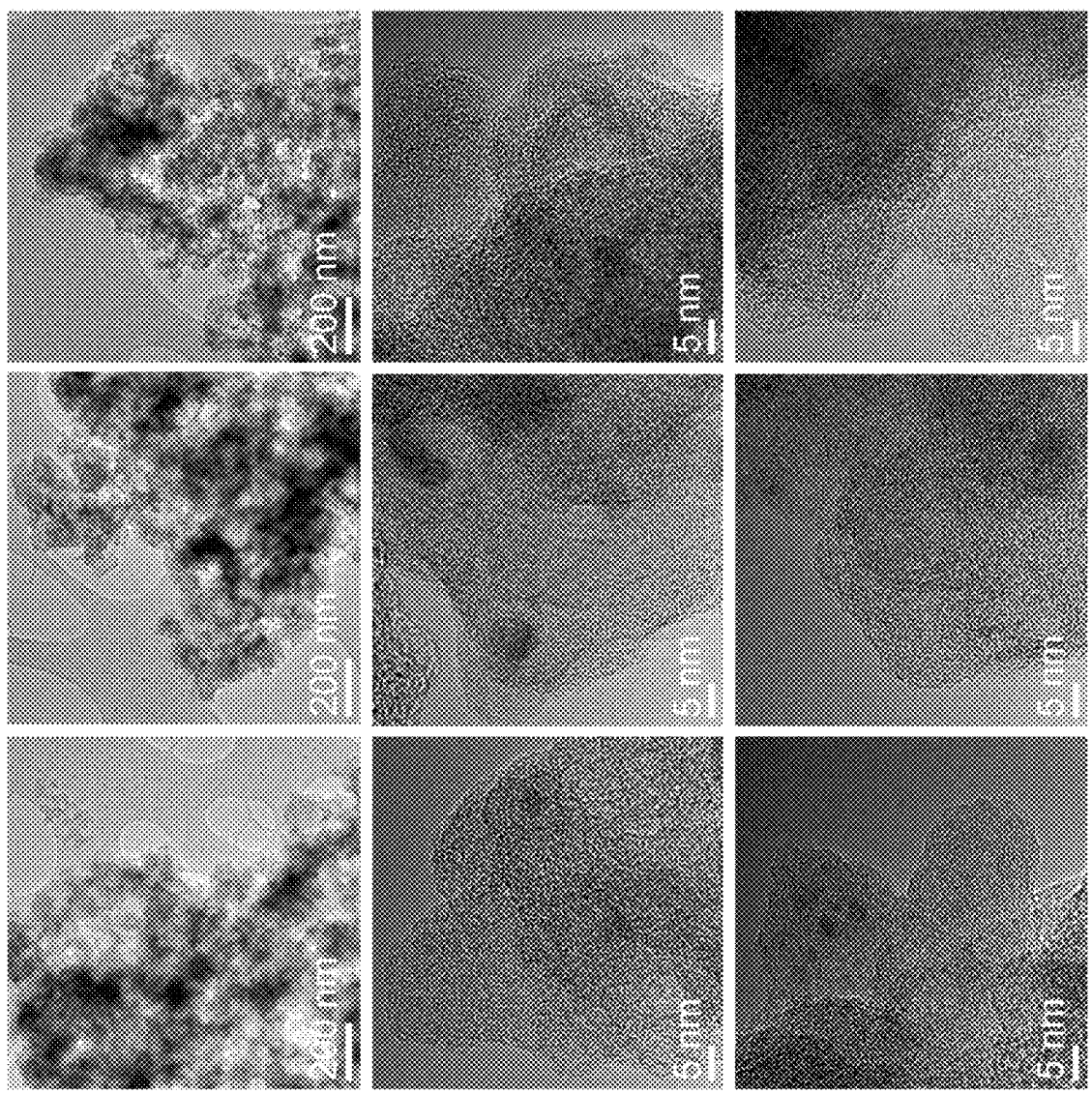
FIGS. 9 and 10 present TEM images of example particles in sample CNOs/Fe. and sample CNOs, respectively, in accordance with certain embodiments described herein.
Figure 10:
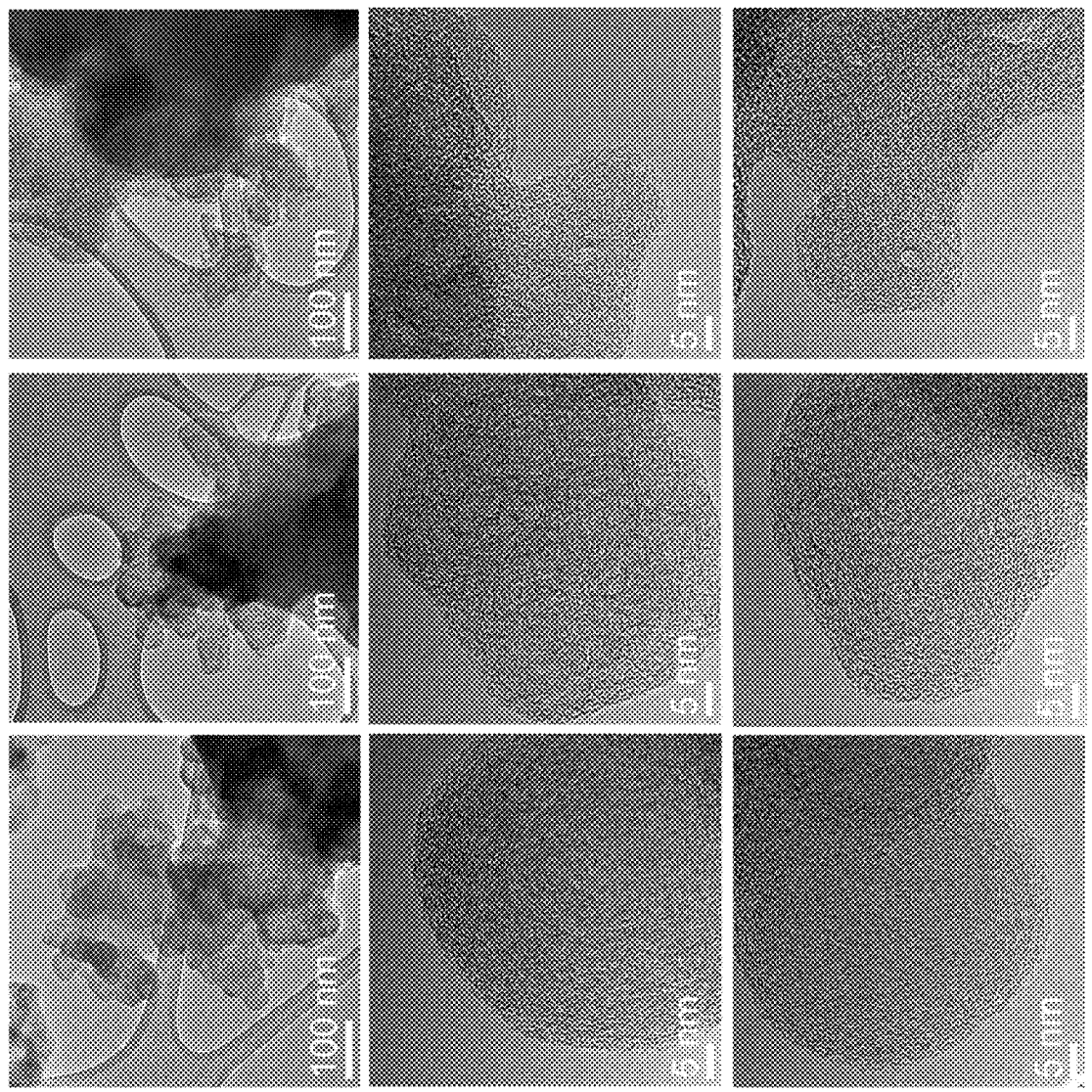

FIGS. 9 and 10 present TEM images of example particles in sample CNOs/Fe and sample CNOs, respectively, in accordance with certain embodiments described herein. Low magnification images of both samples (top row images) show aggregates of interconnected round particles. The particles have diameters of about 20-30 nm in sample CNOs/Fe and about 40-50 nm in sample CNOs. The detailed structure of these particles can be seen in high-resolution (HR) TEM images shown in middle and bottom rows of FIGS. 9 and 10. In both samples, the particles have the structure of turbostratic carbon. The particles comprise (e.g., are composed of) graphitic planes of $sp^2$ carbon. In many places, planes are concentric and parallel one to another, forming onion-like carbon (OLC) structures (see, e.g., C.

Portet et al., "*Electrochemical performance of carbon onions, nanodiamonds, carbon black and multiwalled nanotubes in electrical double layer capacitors,*" Carbon, 45(13), pp. 2511-2518 (2007). However, the particles show also a high degree of disorder and some amorphous carbon. Furthermore, many particles show some empty spherical cavities in their cores. The observed morphological features (e.g., aggregates of interconnected spherical particles with disordered OLC structure and empty core cavities) are characteristic of soot materials (see, e.g., M. Pawlyta and H. Hercman, "*Transmission electron microscopy (TEM) as a tool for identification of combustion products: application to black layers in speleothems,*" Annales Societatis Geologorum Poloniae, Vol. 86 (2016); P. Verma et al., "*Impact of fuel oxygen on morphology and nanostructure of soot particles from a diesel engine*, (2018); Y. Z. An et al., "*Development of a soot particle model with PAHs as precursors through simulations and experiments,*" Fuel, Vol. 179, pp. 246-257 (2016). The additional features appearing as darker spherical spots in most of the HRTEM images of sample CNOs/Fe are small iron-containing nanoparticles with sizes less than 5 nm.

Figure 11:
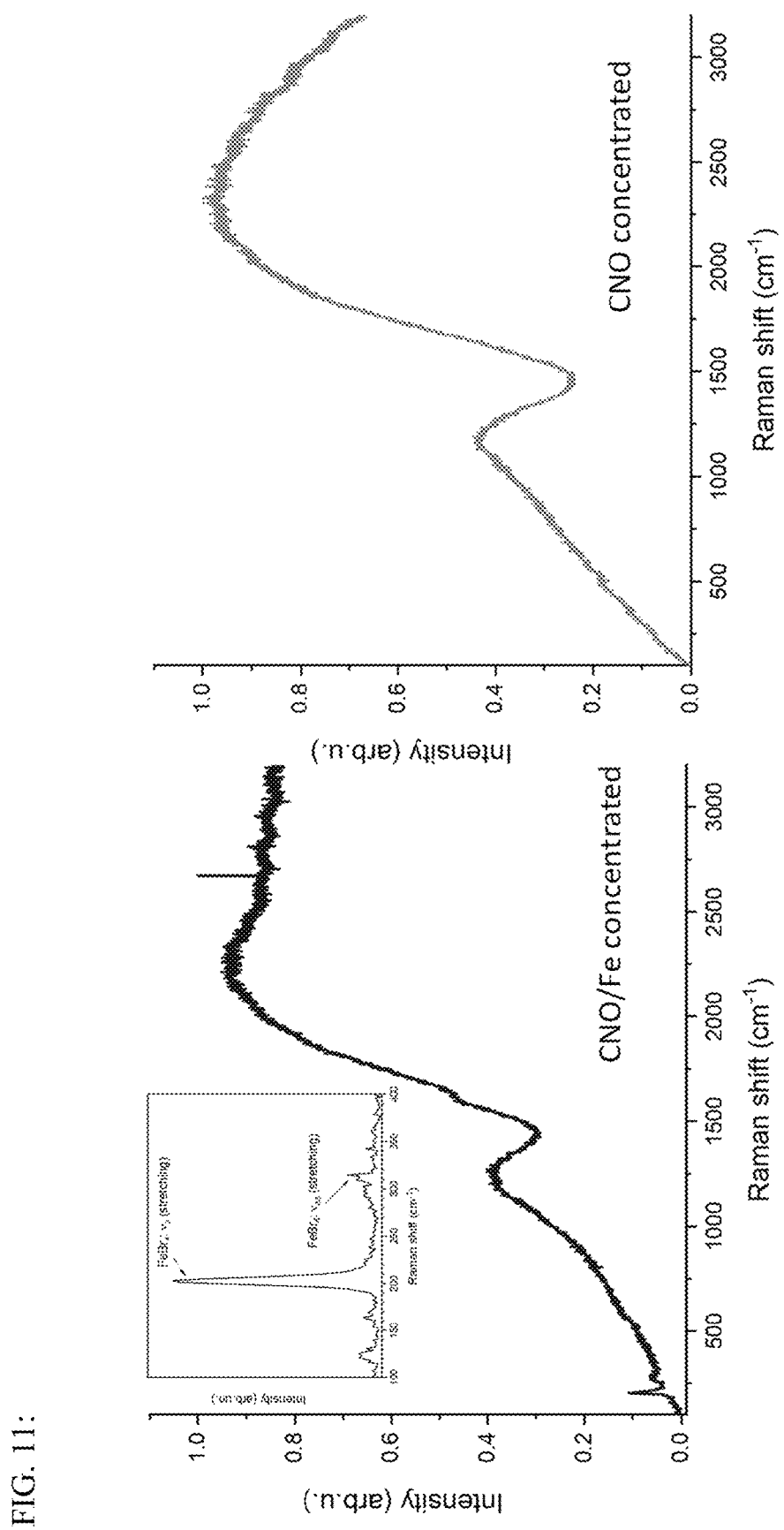
FIG. 11 shows Raman spectra from sample CNO/Fe and CNO in accordance with certain embodiments described herein.

FIG. 11 shows Raman spectra from sample CNO/Fe (left) and CNO (right) in accordance with certain embodiments described herein. The inset shows the background-subtracted low-energy region for sample CNO/Fe. The strong broad band visible in both samples across the region characteristic for carbon peaks is a strong luminescence peak originating from high concertation of bromine in these samples. The only Raman signal that can be detected is the low-energy structure measured for sample CNO/Fe (see inset in left panel). This spectrum can be identified as originating from the stretching mode of the $FeBr_4$ complex (see, e.g., A. García-Saiz et al., "1-*Ethyl*-2, 3-*dimethylimidazolium paramagnetic ionic liquids with* 3*D magnetic ordering in its solid state: synthesis, structure and magnetostructural correlations,*" RSC Advances, 5(75), pp. 60835-60848 (2015); Z. Li et al., "*Ionic iron (III) complexes bearing a dialkylbenzimidazolium cation: Efficient catalysts for magnesium-mediated cross-couplings of aryl phosphates with alkyl bromides,*" Applied Organometallic Chemistry, 31(8), p. e3671 (2017)).

Figure 12A:
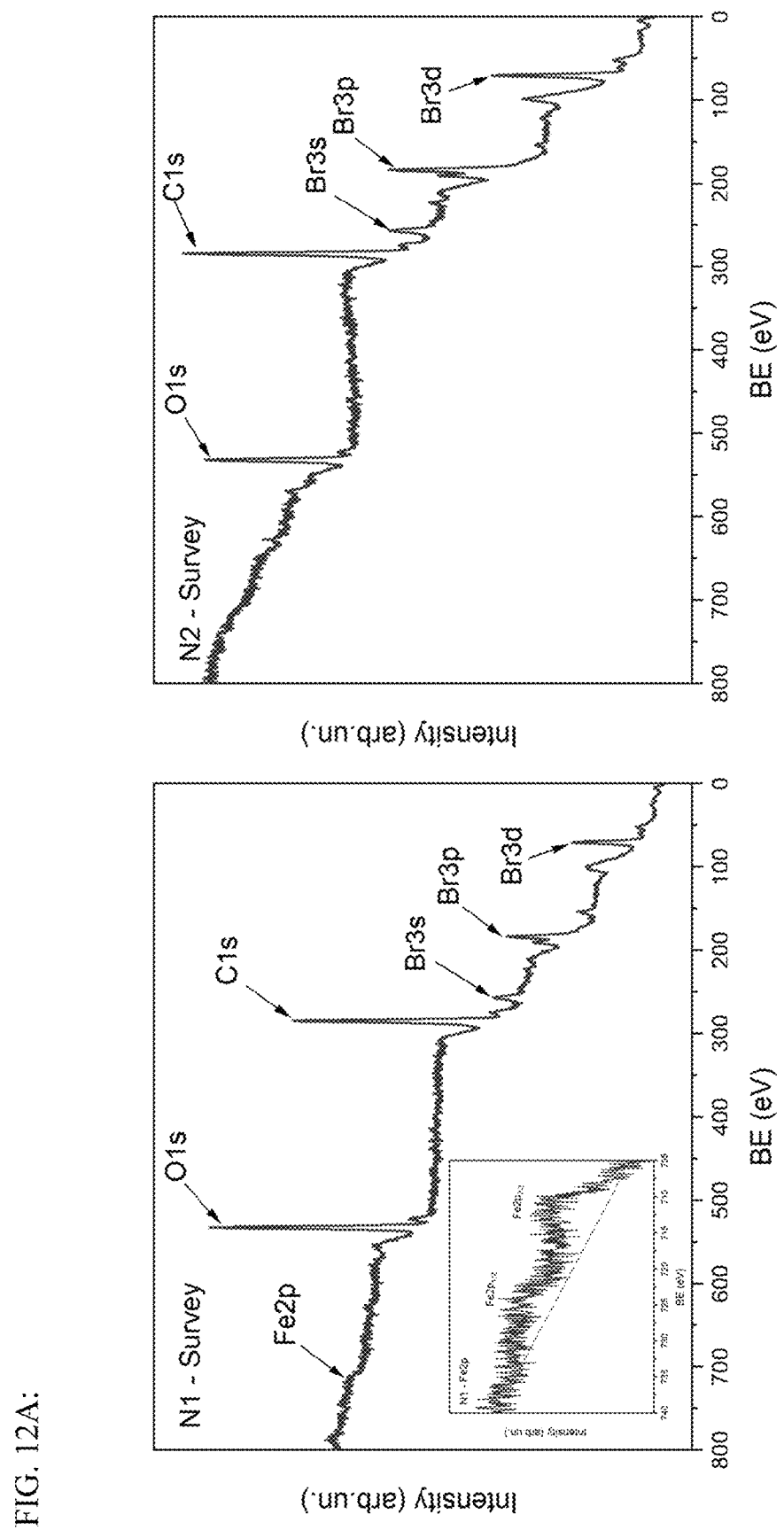
FIGS. 12A-12C show x-ray photoemission spectroscopy (XPS) spectra from samples CNO/Fe and CNO in accordance with certain embodiments described herein.
Figure 12B:
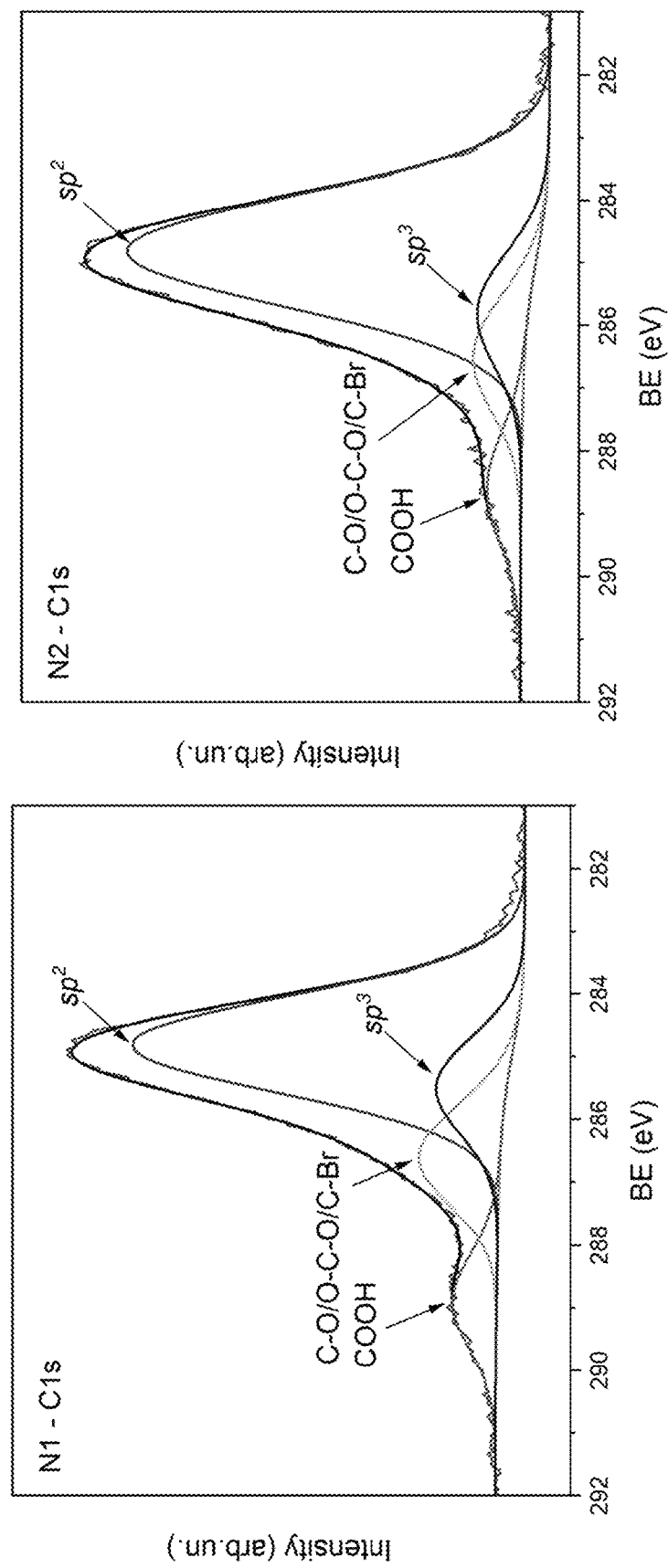
Figure 12C:
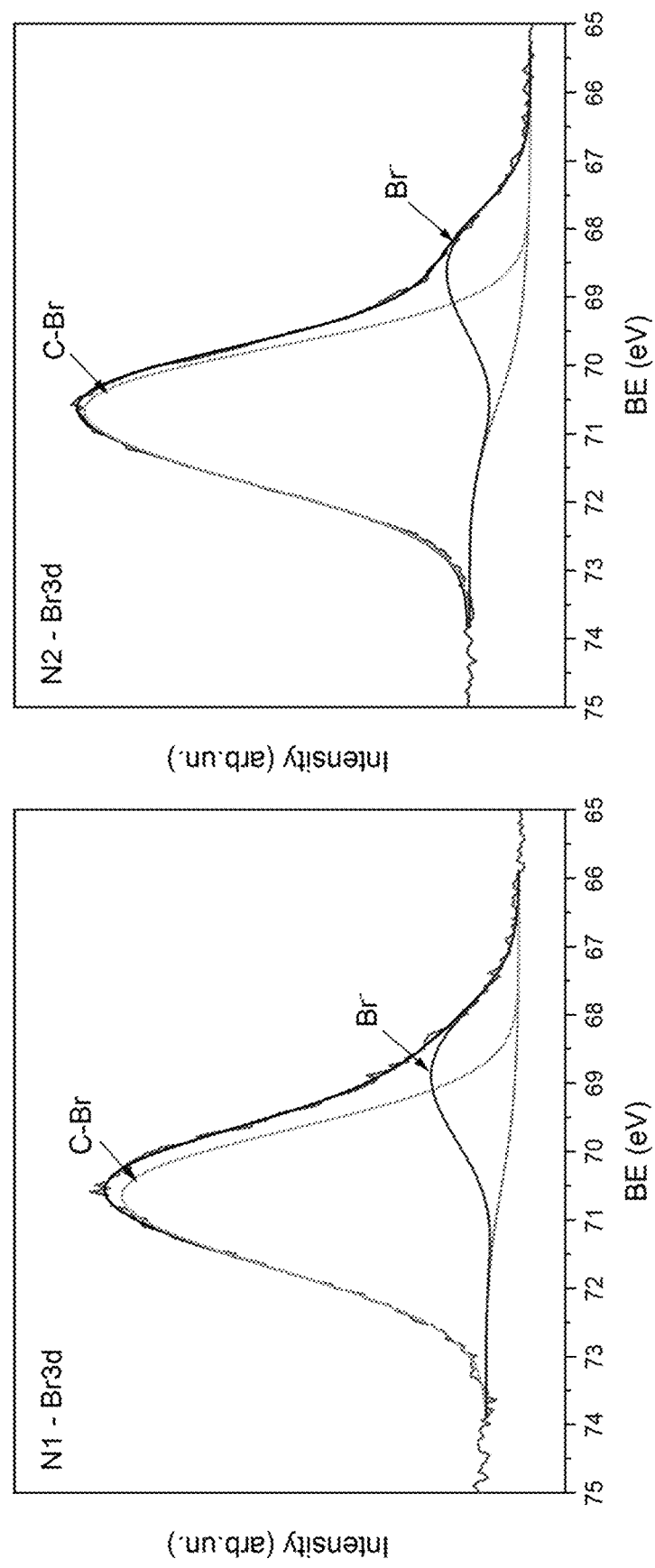

FIGS. 12A-12C show x-ray photoemission spectroscopy (XPS) spectra from samples CNO/Fe (left) and CNO (right) in accordance with certain embodiments described herein. As shown in survey spectra (FIG. 12A) both samples contained C, O, and Br. In addition, sample CNO/Fe contained Fe (see the inset of FIG. 12A), as expected based on HRTEM and Raman results. High-resolution XPS spectra of the C1s and Br3d regions are shown in FIGS. 12B and 12C, respectively. For both samples, the analysis of the C1s spectrum yields four main components at around 284.8, 285.5, 286.5, and 289 eV, which correspond to (1) $sp^2$ carbon, (2) $sp^3$ carbon, (3) C—O, O—C—O, and C—Br groups, and (4) COOH, respectively. Similar analysis of the Br3d, shows the presence of elemental Br and C—Br group.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds, compositions, labeled compounds or biological systems, which can, of course, vary. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

What is claimed is:

1. A method of fabricating an additive for liquid fuel, the method comprising:
    creating a carbon-based material using a plasma generated by kilohertz-range, high voltage, pulsed electrical discharges in an environment comprising at least one hydrocarbon gas and/or at least one liquid containing hydrocarbons, organometallic metal-complex, and/or element-organic compounds;
    evaporating organic material from the carbon-based material;
    halogenating the carbon-based material; and
    extracting carbon nano-onions from the halogenated carbon-based material.

2. The method of claim 1, wherein the plasma comprises a non-equilibrium plasma.

3. The method of claim 1, wherein the high-voltage pulsed electrical discharges are produced using an alternating current source with a voltage in a range of 2 kV to 100 kV, a current in a range of 1 mA to 2 A, and a pulse repetition frequency in a range of 2 kHz to 200 kHz.

4. A method comprising:
    generating a non-equilibrium plasma within a reactor chamber using high-voltage pulsed electrical discharges between electrodes connected to an alternating current source with a voltage in a range of 2 kV to 100 kV, a current in a range of 1 mA to 2 A, and a pulse repetition frequency in a range of 2 kHz to 200 kHz;
    applying the non-equilibrium plasma to a substance within the reactor chamber to create a material containing a plurality of multi-layer carbon-based nanoparticles, the substance comprising at least one carbon-containing gas and/or at least one liquid containing hydrocarbons and/or an organometallic, metal-complex compound and/or at least one element-organic compound.

5. The method of claim 4, wherein the at least one carbon-containing gas comprises at least one hydrocarbon gas is selected from the group consisting of: methane, ethane, propane, butane, propene, ethylene, tetrafluoromethane, and tetrafluoroethane.

6. The method of claim 4, wherein the at least one carbon-containing gas is supplied to the reactor chamber at a temperature in a range of 5 degrees Celsius to 120 degrees Celsius with a pressure in a range of 75 kPa to 250 kPa.

7. The method of claim 4, wherein the at least one liquid is selected from the group consisting of: benzene; gasoline; Kalosha gasoline; hexal; heptane; bromoethane; bromobenzene.

8. The method of claim 4, wherein the at least one liquid is selected from group consisting of: aliphatic and aromatic hydrocarbons; ethers; alcohols; ketones; organic amines and amides.

9. The method of claim 4, wherein the at least one organometallic compound is dissolved in the at least one liquid, the at least one organometallic compound having a weight percentage in solution in a range of 0.5% to 50%.

10. The method of claim 4, wherein the at least one liquid contains ferrocene dissolved in benzene, the ferrocene having a weight percentage in solution in a range of 1% to 20%.

11. The method of claim 4, further comprising:
creating a mixture of the material containing the plurality of multi-layer carbon-based nanoparticles with a solvent; and
extracting the plurality of multi-layer carbon-based nanoparticles from the mixture.

12. The method of claim 11, wherein said extracting the plurality of multi-layer carbon-based nanoparticles comprises using at least one filter with a pore diameter less than 450 nanometers.

13. The method of claim 4, further comprising:
creating a mixture of the material containing the plurality of multi-layer carbon-based nanoparticles with at least one liquid comprising hydrocarbons; and
extracting a carbon-based additive for a liquid fuel from the mixture.

14. The method of claim 13, wherein said extracting the carbon-based additive comprises using at least one filter with a pore diameter less than 450 nanometers.

15. The method of claim 4, further comprising:
evaporating organic material from the material containing the plurality of multi-layer carbon-based nanoparticles;
halogenating the material containing the plurality of multi-layer carbon-based nanoparticles; and
extracting a carbon-based additive for a liquid fuel from the halogenated material containing the plurality of multi-layer carbon-based nanoparticles.

16. The method of claim 15, wherein said evaporating organic material from the material containing the plurality of multi-layer carbon-based nanoparticles comprises heating the material containing the plurality of multi-layer carbon-based nanoparticles to a temperature in a range of 50 to 300 degrees Celsius at atmospheric pressure.

17. The method of claim 15, wherein said halogenating the material containing the plurality of multi-layer carbon-based nanoparticles comprises:
exposing the material containing the plurality of multi-layer carbon-based nanoparticles to liquid bromine;
heating the liquid-bromine-exposed material containing the plurality of multi-layer carbon-based nanoparticles for a time period in a range of 10 to 80 hours; and
evaporating excess bromine from the liquid-bromine-exposed material containing the plurality of multi-layer carbon-based nanoparticles by heating the liquid-bromine-exposed material containing the plurality of multi-layer carbon-based nanoparticles at a temperature in a range of 20 to 120 degrees Celsius at vacuum pressure.

18. The method of claim 15, wherein said extracting the carbon-based additive for a liquid fuel from the halogenated material containing the plurality of multi-layer carbon-based nanoparticles comprises:
evaporating excess halogen-containing material from the material containing the plurality of multi-layer carbon-based nanoparticles;
creating a mixture of the halogenated material containing the plurality of multi-layer carbon-based nanoparticles with a solvent; and
filtering out the carbon-based additive for the liquid fuel from the mixture using at least one filter with pore diameters less than 450 nanometers.

19. The method of claim 4, wherein the electrodes comprise at least one first electrode and at least one second electrode, the at least one first electrode configured to be controllably moved relative to the at least one second electrode.

20. A method comprising:
generating a non-equilibrium plasma within a reactor chamber using high-voltage pulsed electrical discharges between electrodes connected to an alternating current source with a voltage in a range of 2 kV to 100 kV, a current in a range of 1 mA to 2 A, and a pulse repetition frequency in a range of 2 kHz to 200 kHz; and
applying the non-equilibrium plasma to a substance within the reactor chamber to create a material containing a plurality of multi-layer carbon-based nanoparticles, the substance comprising at least one carbon-containing gas and/or at least one liquid containing hydrocarbons.

21. The method of claim 20, wherein the at least one carbon-containing gas comprises at least one hydrocarbon gas is selected from the group consisting of: methane, ethane, propane, butane, propene, ethylene, tetrafluoromethane, and tetrafluoroethane.

22. The method of claim 20, wherein the at least one liquid is selected from the group consisting of: benzene; gasoline; Kalosha gasoline; hexal; heptane; bromoethane; bromobenzene.

23. The method of claim 20, further comprising:
creating a mixture of the material containing the plurality of multi-layer carbon-based nanoparticles with a solvent; and
extracting the plurality of multi-layer carbon-based nanoparticles from the mixture.

24. The method of claim 20, further comprising:
evaporating organic material from the material containing the plurality of multi-layer carbon-based nanoparticles;
halogenating the material containing the plurality of multi-layer carbon-based nanoparticles; and
extracting a carbon-based additive for a liquid fuel from the halogenated material containing the plurality of multi-layer carbon-based nanoparticles.

* * * * *